(12) United States Patent
Iskenderian et al.

(10) Patent No.: US 9,710,943 B2
(45) Date of Patent: Jul. 18, 2017

(54) 2D REGION RENDERING

(75) Inventors: Edward James Iskenderian, Pendle Hill (AU); Paul William Morrison, St Clair (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 1038 days.

(21) Appl. No.: 13/559,427

(22) Filed: Jul. 26, 2012

(65) Prior Publication Data
US 2013/0027402 A1 Jan. 31, 2013

(30) Foreign Application Priority Data

Jul. 29, 2011 (AU) ................................. 2011205085

(51) Int. Cl.
| | | |
|---|---|---|
| *G06T 11/20* | (2006.01) | |
| *G09G 5/00* | (2006.01) | |
| *G06T 15/50* | (2011.01) | |
| *G06T 15/00* | (2011.01) | |
| *G06T 11/40* | (2006.01) | |

(52) U.S. Cl.
CPC .................................... *G06T 11/40* (2013.01)

(58) Field of Classification Search
CPC ....... G06T 11/40; G06T 11/60; G06T 15/503; G06T 15/005; G06T 11/00; G06T 11/001; G06T 2210/12; G06T 7/0083; G09G 5/14; G09G 2340/10; G09G 2340/125
See application file for complete search history.

(56) References Cited

U.S. PATENT DOCUMENTS

| | | | | |
|---|---|---|---|---|
| 5,841,898 A * | 11/1998 | Liguori | ................... | G06T 11/60 358/530 |
| 6,049,339 A | 4/2000 | Schiller et al. | | |
| 6,756,994 B1 * | 6/2004 | Tlaskal | ................. | G06T 15/503 345/440 |
| 6,795,589 B1 * | 9/2004 | Tlaskal | ................... | G06T 11/60 345/629 |
| 6,828,985 B1 * | 12/2004 | Long | ....................... | G06T 11/40 345/418 |

(Continued)

FOREIGN PATENT DOCUMENTS

EP 1642240 B1 6/2004

*Primary Examiner* — Yingchun He
*Assistant Examiner* — Nicole Gillespie
(74) *Attorney, Agent, or Firm* — Canon USA, INC. IP Division

(57) ABSTRACT

Disclosed is a method of rendering a plurality of graphical objects. The method generates a region graph using at least a plurality of intersection points of the graphical objects. The intersection points identify disjoint regions each representing a particular combination of the graphical objects, in which the region graph has at least one region graph link, and defines a relationship between the regions. A contributing level and an activating direction are assigned to at least one of the region graph links, the level and the activation direction defining an appearance of the region associated with said region graph link. The method then renders the plurality of graphical objects using the assigned contributing level and activating direction of the region graph links by traversing the region graph to determine at least one contributing level for each region in the region graph using the assigned contributing level and the activating direction.

20 Claims, 20 Drawing Sheets

(56) References Cited

U.S. PATENT DOCUMENTS

| | | | |
|---|---|---|---|
| 7,075,643 B2* | 7/2006 | Holub | 356/326 |
| 7,714,865 B2 | 5/2010 | Faggion | |
| 2002/0015039 A1* | 2/2002 | Moore | G06T 15/40 345/421 |
| 2005/0116963 A1* | 6/2005 | Bourdev | G06T 15/503 345/619 |
| 2005/0122337 A1* | 6/2005 | Chen | G06T 11/40 345/545 |
| 2006/0001681 A1* | 1/2006 | Smith | 345/629 |
| 2007/0025637 A1* | 2/2007 | Setlur | G06K 9/3233 382/276 |
| 2007/0206012 A1* | 9/2007 | Combes | G06T 11/20 345/441 |
| 2008/0024486 A1* | 1/2008 | Middler | G06T 11/206 345/419 |
| 2008/0079725 A1* | 4/2008 | Sagalov | 345/440 |
| 2009/0295828 A1* | 12/2009 | Koziarz et al. | 345/619 |

* cited by examiner

2D REGION RENDERING

REFERENCE TO RELATED PATENT APPLICATION

This application claims the benefit under 35 U.S.C. §119 of the filing date of Australian Patent Application No. 2011205085, filed Jul. 29, 2011, hereby incorporated by reference in its entirety as if fully set forth herein.

TECHNICAL FIELD

The present invention relates generally to computer-based printer systems and, in particular, to the determination of the contributing levels in each disjoint region of a page in an efficient manner.

BACKGROUND

A computer application typically provides a document in the form of a printable page to a printing device for printing to a hard copy medium, such as a paper sheet. The printable page is typically provided in the form of a description of the page to be printed, specified using a Page Description Language (PDL), such as Adobe® PDF or Hewlett-Packard® PCL. The PDL provides descriptions of graphic objects to be rendered onto the page in a rendering (or z) order. The page is typically rasterised for printing by an object-based graphics system, also known as a Raster Image Processor (RIP). The rasterised page is then sent to a print engine for printing.

Next generation printing devices are expected to operate at a much higher page rate than current printing devices. This is in addition to an increase in device resolution, graphics complexity, and the number of print features that are expected to be supported.

In computing, there is a trend towards achieving higher performance through the use of multi-processor and multi-core architectures. These architectures allow a number of threads to execute in parallel, each on a corresponding processor, thereby reducing the overall time it takes to complete a task. However, even with the performance increase that can be gained through employing parallel architectures, it is still desirable to optimise the underlying algorithms in order to maximise system performance.

The RIP consumes a large proportion of the time that is used by a printing device to print a page of graphic objects. Within the RIP, the graphic objects that contribute to each disjoint region of the page need to be determined. A disjoint region (also known simply as a region) is a two dimensional area of the page containing contiguous pixels that are to be rendered using the same fill, or sequence of fills, and compositing operator, or operators. A fill may consist of a flat colour, a colour gradient, or an image. The colour of all pixels within a disjoint region of a page can be determined by evaluating a sequence of contributing levels for each of the pixels within the region. Each level within a sequence of contributing levels corresponds to a graphic object on the page to be rendered. A level specifies the z-value of the graphic object, the fill that is used to derive the colour of the graphic object, and the operator that is used to combine the graphic object with other overlapping graphic objects. All of the levels within a sequence of contributing levels for a region contribute in some way to the colour of each of the pixels within the region.

The process of determining the graphic objects that contribute to each disjoint region of the page can be time consuming. This is particularly the case for pages containing many overlapping graphic objects. There are many techniques for determining the contributing levels for each disjoint region of the page. A first class of techniques process graphic objects in a scan line sequential manner in order to determine the contributing levels in each disjoint region of the page. A second class of techniques process graphic objects in object order. In this class of techniques, objects may be processed in the order that they are received, or in the reverse order. In yet another class of techniques, objects are processed in accordance with a scanning path that traverses the page in both the horizontal and vertical directions.

An example of a RIP that processes graphic objects in a scan line sequential manner is one that determines the edges of the graphic objects that intersect a given scan line. These edges are sorted according to the position at which they intersect the scan line. After the edges that intersect the given scan line are sorted, these edges are traversed and a list of active levels is determined for each span of pixels that lies between two adjacent edges, or between the first or last edge on the scan line and the page boundaries. Within a span of pixels, the list of active levels contains a reference to the levels that correspond to each of the objects that intersect the span. As the sorted edges are traversed, the list of active levels is updated according to the level associated with each edge on the scan line. Updating the list of active levels involves either inserting a level into the list of active levels as an edge that activates a level is encountered, or removing a level from the list of active levels as an edge that deactivates the level is encountered. The list of active levels in each span of pixels on a scan line is used to generate a list of contributing levels for the span. This list of contributing levels is subsequently used to determine the colour of each of the pixels in the span.

A limitation of this technique is that scan lines are processed independently. Hence, the common trend, for the list of contributing levels between a pair of adjacent edges to be the same for many scan lines, is not exploited. Therefore, much of the effort of determining the list of contributing levels for each span is repeated. This is very inefficient. Some scan line sequential techniques address this limitation by caching the list of contributing levels for the edges that intersect a current scan line. If certain conditions are met, the cached list of contributing levels can be used on subsequent scan lines, instead of calculating a new list of contributing levels for each edge. However, despite this optimisation, redundant processing is still often performed.

An example of a RIP which processes graphic objects in object order is one that generates a planar map representation of a page of graphic objects to be rendered. Each region within the planar map corresponds to a disjoint region of the page to be rendered. The colour of each region of the planar map is specified as a function of the transparency and colour characteristics of the graphic objects that contribute to the colour of pixels within region. This technique works well for simple pages, but the complexity of calculating the planar map for pages containing complex graphics is high. In addition, relationships between disjoint regions are not exploited. Many of the calculations in determining the list of contributing levels are repeated for many of the regions, and are therefore redundant.

In another technique, a different scan path is chosen in order to reduce the total number of edge crossings, and therefore reduce the number of calculations required to determine the contributing levels for each disjoint region. While this technique reduces the total amount of processing, it does not avoid the repeated calculations required to determine the contributing levels for each region of the page in many cases.

SUMMARY

According to one aspect of the present disclosure, there is provided method of rendering a plurality of graphical objects. The method generates a region graph using at least a plurality of intersection points of the graphical objects. The intersection points identify disjoint regions each representing a particular combination of the graphical objects, in which the region graph has at least one region graph link, and defines a relationship between the regions. A contributing level and an activating direction are assigned to at least one of the region graph links, the level and the activation direction defining an appearance of the region associated with said region graph link. The method then renders the plurality of graphical objects using the assigned contributing level and activating direction of the region graph links by traversing the region graph to determine at least one contributing level for each region in the region graph using the assigned contributing level and the activating direction.

Desirably the rendering step comprises rendering each region to pixels using the contributing level associated with the region.

Preferably the step of the generating the region graph comprises generating a plurality of nodes for an edge graph based on the plurality of intersection points of the graphical objects, and generating the region graph from the edge graph. Here, the generating may comprise generating a dual for the edge graph to form the region graph. The dual of the edge graph is the region graph which has: (a) a node for each plane region of the edge graph, and (b) at least a region graph link joining two neighbourhood regions of the edge graph.

The dual may be determined by: sorting the edge graph edges dividing neighbourhood regions of the edge graph in a predetermined direction from a current edge; determining a next edge in the predetermined direction at an edge graph node where the current edge and the next edge meet; adding a node of the region graph to a region, said region having an appearance determined by the next edge; and assigning a contributing level and an activating direction to a region graph link ending at the added node, the level and the activation direction defining the appearance of the region.

Preferably the contributing level associated with a region graph link is associated with an edge of the edge graph that the region graph link crosses.

Advantageously, the activating direction of a region graph link is the direction towards a node of the region graph to which the contributing level of the region graph link is assigned.

Also disclosed is a method of rendering a plurality of graphical objects, comprising generating a first region graph node for an object edge pair in a current scan line; sorting the object edge pair in a subsequent scan line; determining a crossing of said object edge pair in the subsequent scan line; generating a second region graph node as a result of the crossing of said object edge pair; joining the first region graph node and the second region graph node to form a region graph link;

associating a contributing level and an activating direction to the region graph link, said level and said activation direction defining an appearance of the region associated with the second region graph node; and rendering the plurality of graphical objects using the assigned contributing level and activating direction of the region graph link by traversing the region graph to determine at least one contributing level for each region in the region graph using the assigned contributing level and the activating direction.

Desirably the above rendering step comprises rendering each region to pixels using the contributing level associated with the region.

Preferably the activating direction of a region graph link is the direction towards a node of the region graph to which the contributing level of the region graph link is assigned.

Also disclosed is a method of rendering a page comprising a plurality of graphical objects, comprising: determining a rendering complexity associated with at least a portion of the page and graphical objects of that portion; comparing the determined complexity with a threshold value; and region rendering the portion, where the determined complexity is less than the threshold, according to the approaches discussed above. This method may further comprise scan rendering the portion, where the determined complexity is greater than the threshold, according to a scan-line rendering technique. The portion may comprise a band of the page. The portion may comprise a tile of the page.

In this latter instance, the method may further identify at least one said graphical object which spans a first tile to be scan rendered and a second tile to be region rendered; divide said one graphical object into a first part within the first tile and a second part with the second tile; scan render the first tile including the first part; and region render the second tile including the second part.

Other aspects are also disclosed.

BRIEF DESCRIPTION OF THE DRAWINGS

At least one embodiment of the present invention will now be described with reference to the following drawings, in which:

FIG. 10b shows the graph of edges generated from the object edges of graphic objects and intersection points shown in FIG. 10a;

DETAILED DESCRIPTION INCLUDING BEST MODE

Figure 14:
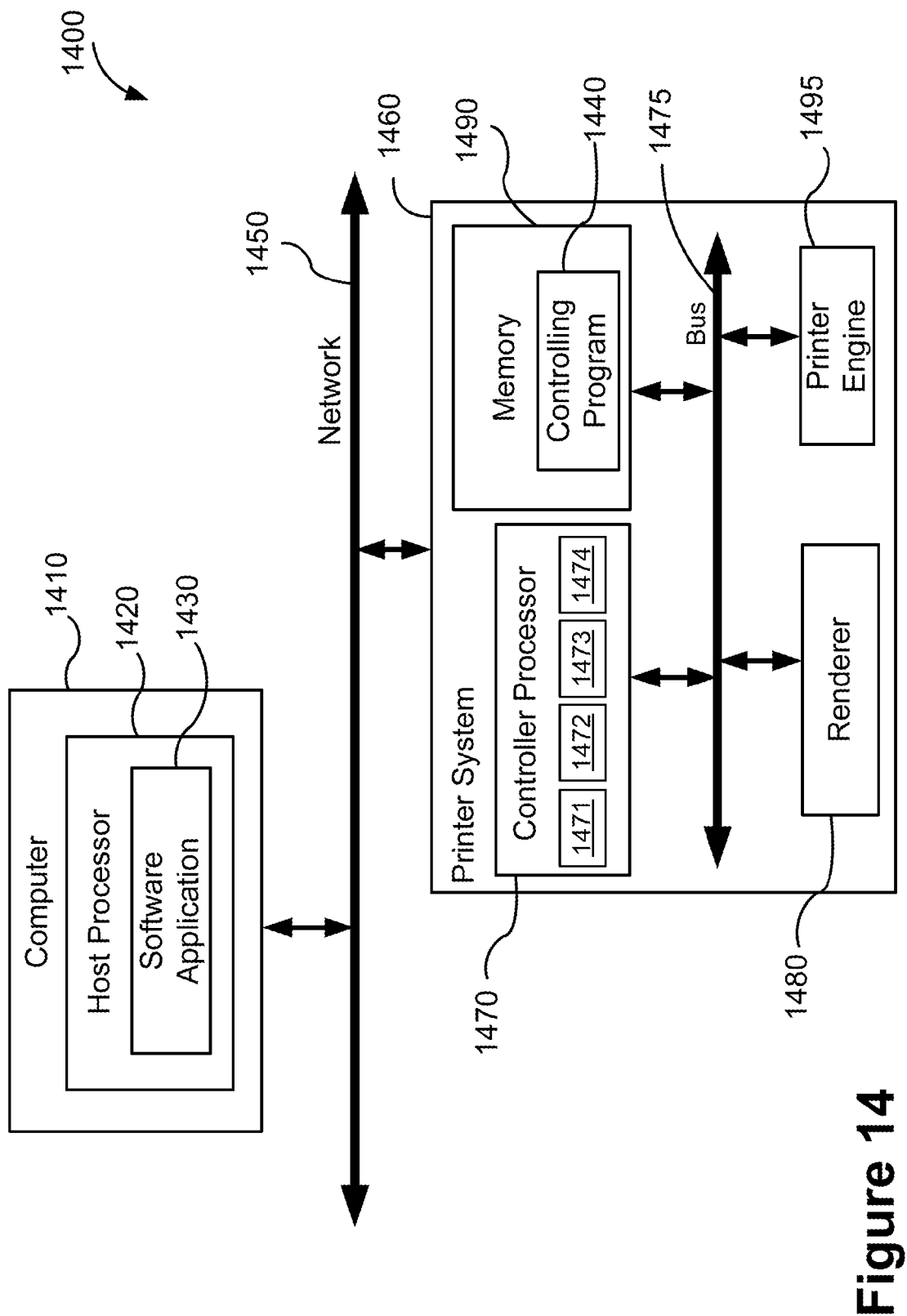
FIG. 14 shows a schematic block diagram of a pixel rendering system for rendering the graphic objects of a page.

FIG. 14 shows a schematic block diagram of a Pixel Rendering System 1400 for rendering graphic objects which are processed in accordance with the present disclosure. The Pixel Rendering System 1400 comprises a Computer 1410 connected to a Printer System 1460 through a Network 1450. The Network 1450 may be a typical network involving multiple computers, or may be a simple connection between a single Computer 1410 and a Printer System 1460.

The Computer 1410 comprises a Host Processor 1420 for executing a Software Application 1430, such as a word processor or graphical software application, for generating a printable page.

The Printer System 1460 comprises a multi-core Controller Processor 1470 having, in this case, four processor cores 1471, 1472, 1473 and 1474, for executing a Controlling Program 1440 which is stored in a Memory 1490, a renderer 1480, and a Printer Engine 1495, each coupled via a Bus 1475. The renderer 1480 is preferably in the form of an application specific integrated circuit (ASIC) coupled via the bus 1475 to the controller processor 1470, memory 1490, and the printer engine 1495. However, the renderer 1480 may also be implemented in software that is stored in the memory 1490 and is executable by the controller processor 1470. The renderer 1480 renders the page representation resulting from the execution of the Controlling Program 1440 to pixels. The Controlling Program 1440 will later be described with reference to FIG. 6.

The Controlling Program 1440 is configured to be executed by the Controller Processor 1470 in one or more threads of execution. A thread includes of a number of instructions or steps that are executed by a processor core 1471-1474 in sequence. Additional threads may also be executed by the Controller Processor 1470. These threads may include the threads of an operating system that may also be running on the Controller Processor 1470. These additional threads may be executed by a processor core 1471-1474, or by any additional processor cores that are not used to execute threads of the present invention.

Figure 15:
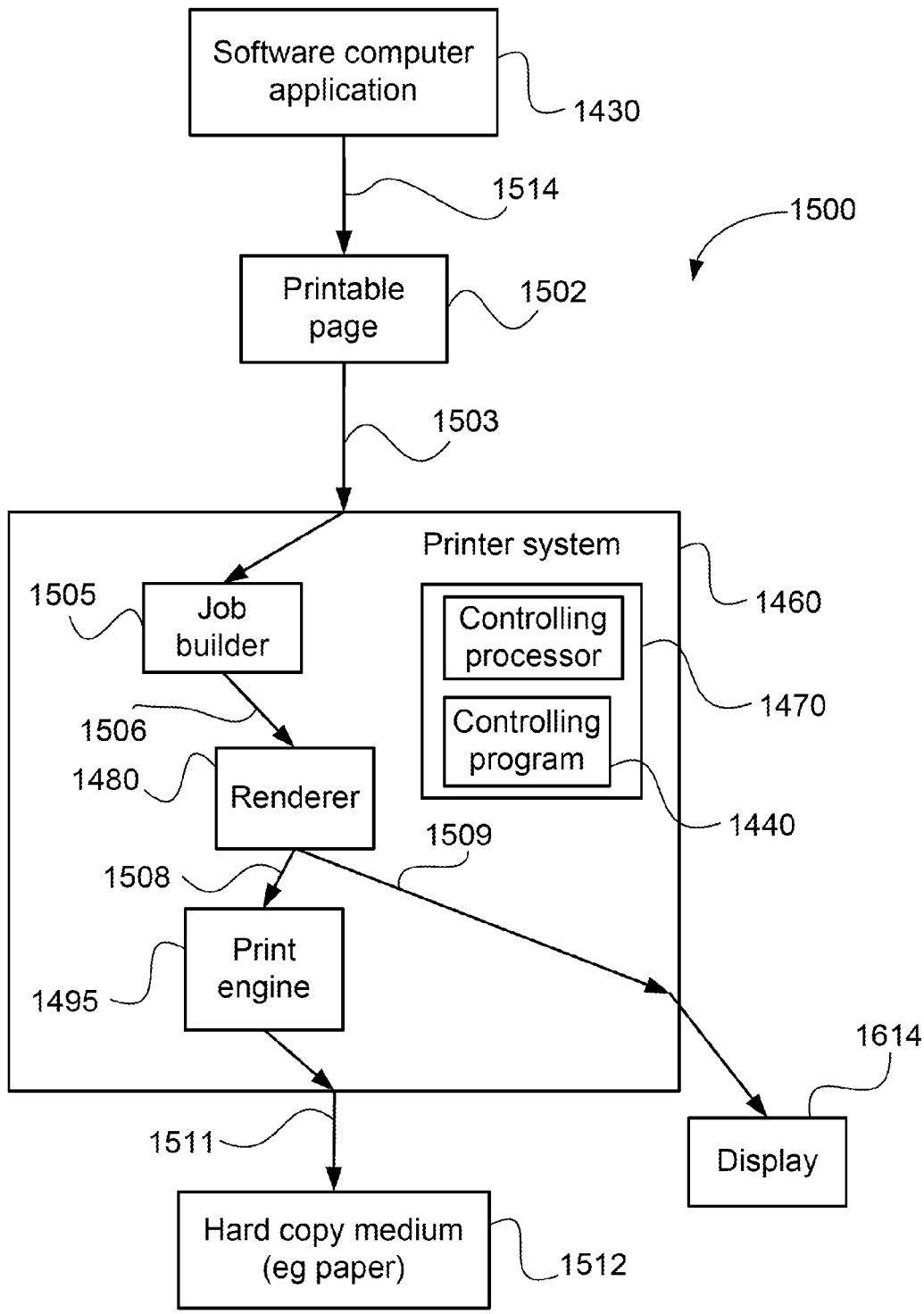
FIG. 15 shows how a software computer application provides a printable page to a printing device for printing to a hard copy medium such as a paper sheet.

FIG. 15 shows the software computer application 1430 providing a printable page 1502 to the printer system 1460 for printing to a hard copy medium 1512, such as a paper sheet. The printable page 1502 is typically provided in the form of a description of the page to be printed, the description being specified using a Page Description Language (PDL), such as Adobe® PDF or Hewlett-Packard® PCL. The PDL provides descriptions of graphic objects to be rendered onto the page in a rendering (or z) order, as opposed to a raster image (i.e. a bitmap of pixel values) of the page to be printed.

The printer system 1460 receives a description 1503 of the page to be printed 1502 and generates an intermediate representation 1506 of the page 1502, using a job builder 1505. The printer system 1460 then uses the renderer 1480 to render the intermediate representation 1506 of the page 1502 to a raster image representation 1508 comprising pixels which are printed to the print media 1512, such as paper, using a print engine 1495. The raster image representation 1508 may also be sent to a display 1614. In general, the intermediate representation 1506 of the page 1502 consumes less memory than the raster image representation 1508.

In some prior art printing devices, the intermediate representation 1506 of the page 1502 may be rendered to pixels in real-time by the renderer 1480, this being the rate at which the output device, be it the printer engine 1495 or the display 1614, can reproduce output pixels. Real-time rendering is particularly important for video displays, where animation frame rates must be met to ensure fluidity of motion. Real-time rendering in a printing environment is important to ensure compliance with page throughput rates of a print engine.

The intermediate page representation 1506 is generated by the controller program 1440 which is executed by the controller processor 1470 within the printer system 1460. The controller processor 1470 may be implemented as a multi-core processor. The intermediate page representation 1506 is transferred to the renderer 1480, which renders the intermediate page representation to pixels 1508 and prints 1511 the pixels onto the print media 1512 using the printer engine 1495 which may, for example, be an electro-photographic engine. The aforementioned description relates to various functional modules such as the job builder 1505. Such modules can be implemented in hardware, software, or a hybrid mix of hardware and software.

Figure 16A:
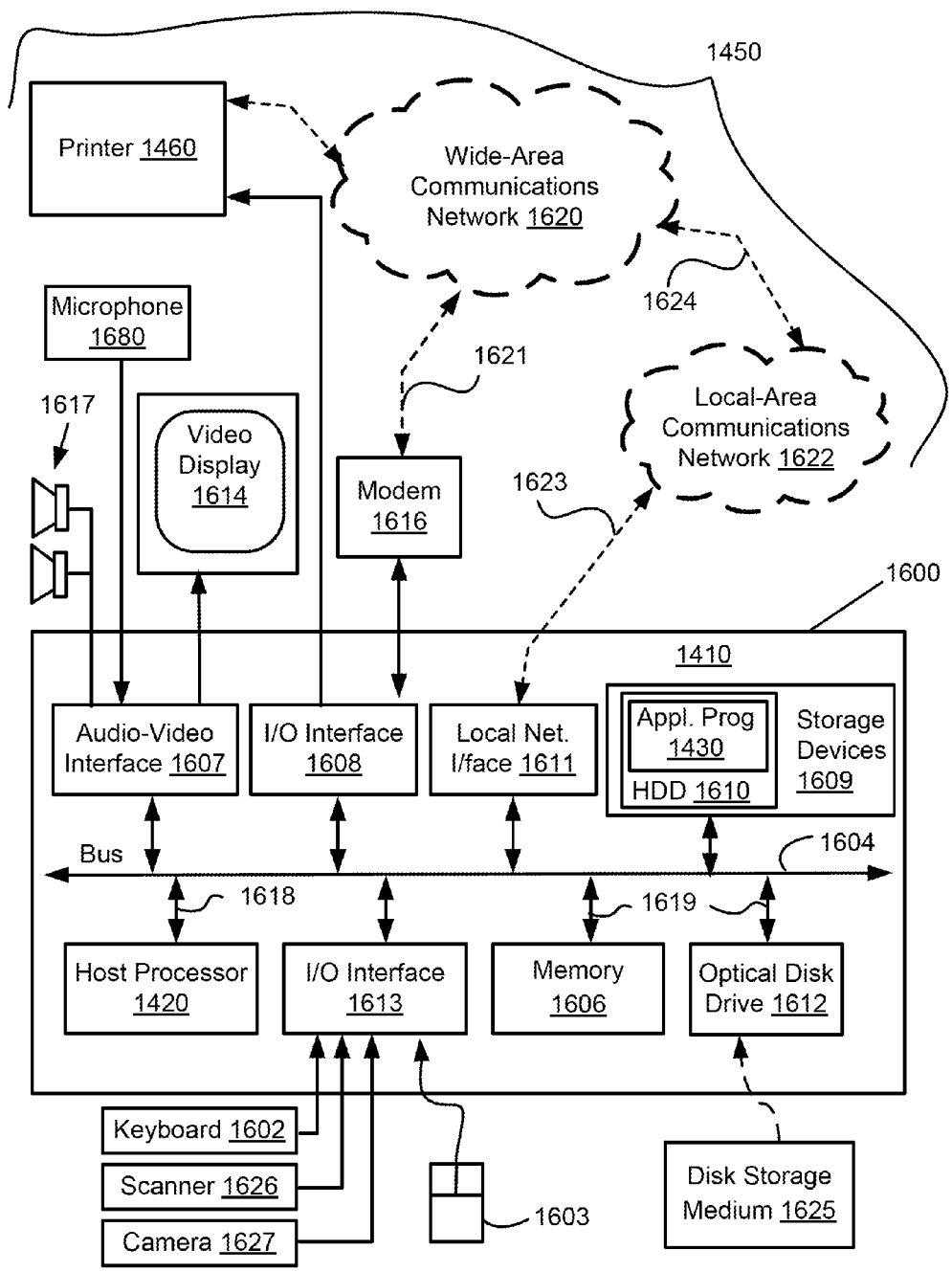
FIGS. 16a and 16b collectively form a schematic block diagram of general purpose computer system in which the arrangement of FIG. 14 may be implemented.
Figure 16B:
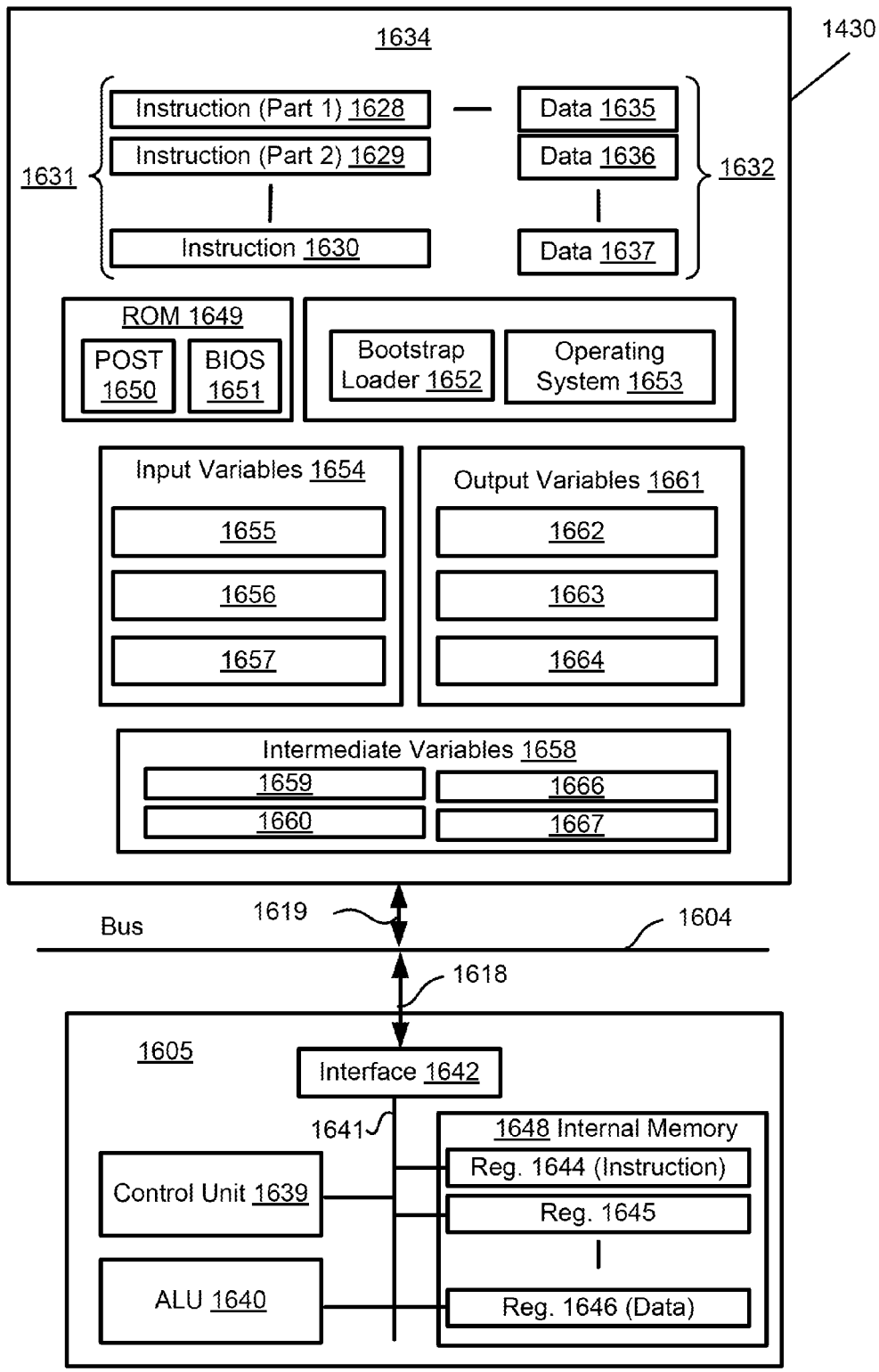

FIG. 16a and FIG. 16b depict a general-purpose Computer System 1600, upon which the various arrangements described can be practiced.

As seen in FIG. 16a, the Computer System 1600 includes: the Computer Module 1410; input devices such as a Keyboard 1602, a Mouse Pointer Device 1603, a Scanner 1626, a Camera 1627, and a Microphone 1680; and output devices including the Printer System 1460, the Display device 1614 and Loudspeakers 1617. An external Modulator-Demodulator (Modem) transceiver device 1616 may be used by the Computer Module 1410 for communicating to and from a Communications Network 1620 via a Connection 1621. The Communications Network 1620 may be a wide-area network (WAN), such as the Internet, a cellular telecommunications network, or a private WAN. Where the connection 1621 is a telephone line, the Modem 1616 may be a traditional "dial-up" modem. Alternatively, where the Connection 1621 is a high capacity (e.g., cable) connection, the Modem 1616 may be a broadband modem. A wireless modem may also be used for wireless connection to the Communications Network 1620. The components 1620-1624 may be considered equivalent to, and an example of, the Network 1450 of FIG. 14 to which the Printer System 1460 couples as seen in FIG. 16a.

The Computer Module 1410 typically includes at least one Host Processor 1420, and a Memory 1606. For example, the Memory 1606 may have semiconductor random access memory (RAM) and semiconductor read only memory (ROM). The Computer Module 1410 also includes an number of input/output (I/O) interfaces including: an Audio-Video Interface 1607 that couples to the Video Display 1614, the Loudspeakers 1617 and the Microphone 1680; an I/O interface 1613 that couples to the Keyboard 1602, the Mouse 1603, the Scanner 1626, the Camera 1627 and optionally the joystick or other human interface device (not illustrated); and an I/O Interface 1608 for the Modem 1616 and the Printer System 1460. In some implementations, the Modem 1616 may be incorporated within the Computer Module 1410, for example within the I/O Interface 1608. The Computer Module 1410 also has a Local Network Interface 1611, which permits coupling of the Computer System 1600 via a Connection 1623 to a Local-Area Communications Network 1622. As illustrated in FIG. 16a, the Local-Area Communications Network 1622 may also couple to the Wide-Area Communications Network 1620 via the Connection 1624, which would typically include a so-called "firewall" device or device of similar functionality. The Local Network Interface 1611 may comprise an Ethernet circuit card, a Bluetooth™ wireless arrangement or an IEEE 802.11 wireless arrangement; however, numerous other types of interfaces may be practiced for the Local Network Interface 1611.

The I/O interfaces 1608 and 1613 may afford either or both of serial and parallel connectivity, the former typically being implemented according to the Universal Serial Bus (USB) standards and having corresponding USB connectors (not illustrated). Storage Devices 1609 are provided and typically include a hard disk drive, HDD 1610. Other storage devices such as a floppy disk drive and a magnetic tape drive (not illustrated) may also be used. An Optical Disk Drive 1612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1600.

The components 1420 to 1613 of the Computer Module 1410 typically communicate via a Bus 1604 and in a manner that results in a conventional mode of operation of the Computer System 1600 known to those in the relevant art. For example, the Host Processor 1420 is coupled to the Bus 1604 using a connection 1618. Likewise, the memory 1606 and Optical Disk Drive 1612 are coupled to the Bus 1604 by Connections 1619. Examples of computers on which the described arrangements can be practised include IBM-PC's and compatibles, Sun Sparc stations, Apple Mac™ or like computer systems.

The Software Application program 1430 is executable within the Computer System 1600. In particular, the steps of the Software Application 1430 are effected by Software Instructions 1631 (see FIG. 16b) in the Software Application 1430 that are carried out within the Computer System 1600. The Software Instructions 1631 may be formed as one or more code modules, each for performing one or more particular tasks. The software 1430 may also be divided into two separate parts, in which a first part and the corresponding code modules performs the application (e.g. word processing or graphical imaging) methods and a second part and the corresponding code modules manage a user interface between the first part and the user.

The software Application 1430 may be stored in a computer readable medium, including the storage devices described below, for example. The software 1430 is loaded into the Computer System 1600 from the computer readable medium, and then executed by the Computer System 1600. A computer readable medium having such software or computer program recorded on the computer readable medium is a computer program product. The use of the computer program product in the computer system 1600 effects apparatus for graphical document generation.

The software Application 1430 is typically stored in HDD 1610 or the memory 1606. The software is loaded into Computer System 1600 from a computer readable medium, and executed by the Computer System 1600. Thus, for example, the Software Application 1430 may be stored on an optically readable disk storage medium (e.g., CD-ROM) 1625 that is read by the Optical Disk Drive 1612.

In some instances, the Software Application 1430 may be supplied to the user encoded on one or more CD-ROMs 1625 and read via the corresponding drive 1612, or alternatively may be read by the user from the Wide-Area Communications Network 1620 or Local-Area Communications Network 1622. Still further, the software 1430 can also be loaded into the Computer System 1600 from other computer readable media. Computer readable storage media refers to any physical non-transitory storage medium that provides recorded instructions and/or data to the Computer System 1600 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the Computer Module 1410. Examples of transitory computer readable transmission media that may also participate in the provision of software, application programs, instructions and/or data to the Computer Module 1410 include radio or infra-red transmission channels as well as a network connection to another computer or networked device, and the Internet or Intranets including e-mail transmissions and information recorded on Websites and the like.

The second part of the Software Application 1430 and the corresponding code modules mentioned above may be executed to implement one or more graphical user interfaces (GUIs) to be rendered or otherwise represented upon the Video Display 1614. Through manipulation of typically the Keyboard 1602 and the Mouse 1603, a user of the Computer System 1600 and the application 1430 may manipulate the interface in a functionally adaptable manner to provide controlling commands and/or input to the applications associated with the GUI(s). Other forms of functionally adaptable user interfaces may also be implemented, such as an audio interface utilizing speech prompts output via the Loudspeakers 1617 and user voice commands input via the microphone 1680.

FIG. 16b is a detailed schematic block diagram of the Host Processor 1420 and a "memory" 1634. The memory 1634 represents a logical aggregation of all the memory modules (including the HDD 1609 and semiconductor memory 1606) that can be accessed by the computer module 1410 in FIG. 16a.

When Computer Module 1410 is initially powered up, a power-on self-test (POST) program 1650 executes. The POST program 1650 is typically stored in a ROM 1649 of the semiconductor memory 1606 of FIG. 16a. A hardware device such as the ROM 1649 storing software is sometimes referred to as firmware. The POST program 1650 examines hardware within the Computer Module 1410 to ensure proper functioning and typically checks the Host Processor 1420, the Memory 1634 (1609, 1606), and a basic input-output systems software (BIOS) module 1651, also typically stored in the ROM 1649, for correct operation. Once the POST program 1650 has run successfully, the BIOS 1651 activates the hard disk drive 1610 of FIG. 16a. Activation of the hard disk drive 1610 causes a bootstrap loader program 1652 that is resident on the hard disk drive 1610 to execute via the Host Processor 1420. This loads an Operating System 1653 into the RAM memory 1606, upon which the operating system 1653 commences operation. The operating system 1653 is a system level application, executable by the Host Processor 1420, to fulfil various high level functions, including processor management, memory management, device management, storage management, software application interface, and generic user interface.

The Operating System 1653 manages the Memory 1634 (1609, 1606) to ensure that each process or application running on the computer module 1410 has sufficient memory in which to execute without colliding with memory allocated to another process. Furthermore, the different types of memory available in the system 1600 of FIG. 16a must be used properly so that each process can run effectively. Accordingly, the aggregated memory 1634 is not intended to illustrate how particular segments of memory are allocated (unless otherwise stated), but rather to provide a general view of the memory accessible by the Computer System 1600 and how such is used.

As shown in FIG. 16b, the Host Processor 1420 includes a number of functional modules including a Control Unit 1639, an arithmetic logic unit (ALU) 1640, and a local or Internal Memory 1648, sometimes called a cache memory. The Internal Memory 1648 typically includes a number of storage registers 1644-1646 in a register section. One or more internal busses 1641 functionally interconnect these functional modules. The Host Processor 1420 typically also has one or more interfaces 1642 for communicating with external devices via Bus 1604, using a connection 1618. The memory 1634 is coupled to Bus 1604 using a connection 1619.

The Software Application 1430 includes a sequence of instructions 1631 that may include conditional branch and loop instructions. The Software Application 1430 may also include data 1632 which is used in execution of the Software Application 1430. The instructions 1631 and the data 1632 are stored in memory locations 1628, 1629, 1630 and 1635, 1636, 1637, respectively. Depending upon the relative size of Program Instructions 1631 and the memory locations 1628-1630, a particular instruction may be stored in a single memory location as depicted by the instruction shown in the memory location 1630. Alternately, an instruction may be segmented into a number of parts each of which is stored in a separate memory location, as depicted by the instruction segments shown in the memory locations 1628 and 1629.

In general, the Host Processor 1420 is given a set of instructions which are executed therein. The Host Processor 1420 waits for a subsequent input, to which the Host Processor 1420 reacts to by executing another set of instructions. Each input may be provided from one or more of a number of sources, including data generated by one or more of the input devices 1602, 1603, data received from an external source across one of the networks 1620, 1602, data retrieved from one of the storage devices 1606, 1609 or data retrieved from a storage medium 1625 inserted into the corresponding reader 1612, all depicted in FIG. 16a. The execution of a set of the instructions may in some cases result in output of data. Execution may also involve storing data or variables to the memory 1634.

The disclosed arrangements may use Input Variables 1654, which are stored in Memory 1634 in corresponding memory locations 1655, 1656, 1657. The arrangements may produce Output Variables 1661, which are stored in the memory 1634 in corresponding memory locations 1662, 1663, 1664. Intermediate Variables 1658 may be stored in memory locations 1659, 1660, 1666 and 1667.

Referring to the Host Processor 1420 of FIG. 16b, the registers 1644, 1645, 1646, the arithmetic logic unit, ALU 1640, and the Control Unit 1639 work together to perform sequences of micro-operations needed to perform "fetch, decode, and execute" cycles for every instruction in the instruction set making up the Software Application 1430. Each fetch, decode, and execute cycle comprises:

(a) a fetch operation, which fetches or reads an instruction 1631 from a memory location 1628, 1629, 1630;

(b) a decode operation in which the control unit 1639 determines which instruction has been fetched; and (c) an execute operation in which the control unit 1639 and/or the ALU 1640 execute the instruction.

Thereafter, a further fetch, decode, and execute cycle for the next instruction may be executed. Similarly, a store cycle may be performed by which the Control Unit 1639 stores or writes a value to Memory Location 1632.

Each step or sub-process in the processes described is typically associated with one or more segments of the Software Application 1430 and is performed by the register section 1644, 1645, 1647, the ALU 1640, and the control unit 1639 in the processor 1420 working together to perform the fetch, decode, and execute cycles for every instruction in the instruction set for the noted segments of the Software Application 1430.

Operation of the Printer System 1460 is similar to that of the personal computer in terms of storage and execution of the Controlling Program 1440 by the Memory 1490 and the Controller Processor 1470 respectively, noting however that the controlling program is multithreaded with distinct program threads executing on corresponding ones of the multiple processing cores making up the controller processor 1470.

Returning to FIG. 14, in the Pixel Rendering System 1400, the Software Application 1430 creates page-based documents for printing such as 1502, where each page contains objects such as text, lines, fill regions, and image data. The Software Application 1430 sends a high-level description of the page (for example a PDL file) to the Controlling Program 1440 that is executed in the Controller Processor 1470 of the Printer System 1460 via the Network 1450. A page, such as the page 1502, is also known to the job builder 1505 and controlling program 1440 as a "rendering job". A rendering job contains all information required by the Pixel Rendering System 1400 to RIP, render, and print the page.

The Controlling Program 1440 receives a description of the page to be printed 1502 from the Software Application 1430, and performs the job building process 1505 to generate the intermediate representation 1506 of the page 1502. The Controlling Program 1440 may divide the rendering job into a number of "tasks" or "page building jobs". Each task or page building job completes a portion of the RIP process for a given rendering job, and is executed by a processor core such as 1471, 1472, 1473 and 1474. The Controlling Program 1440, as executed by the Controller Processor 1470, is also responsible for instructing the renderer 1480 to render the intermediate representation 1506 of the page 1502 to pixels 1508, and for instructing the Printer Engine 1495 to and to print the pixels 1508 onto print media such as paper 1512.

Figure 1:
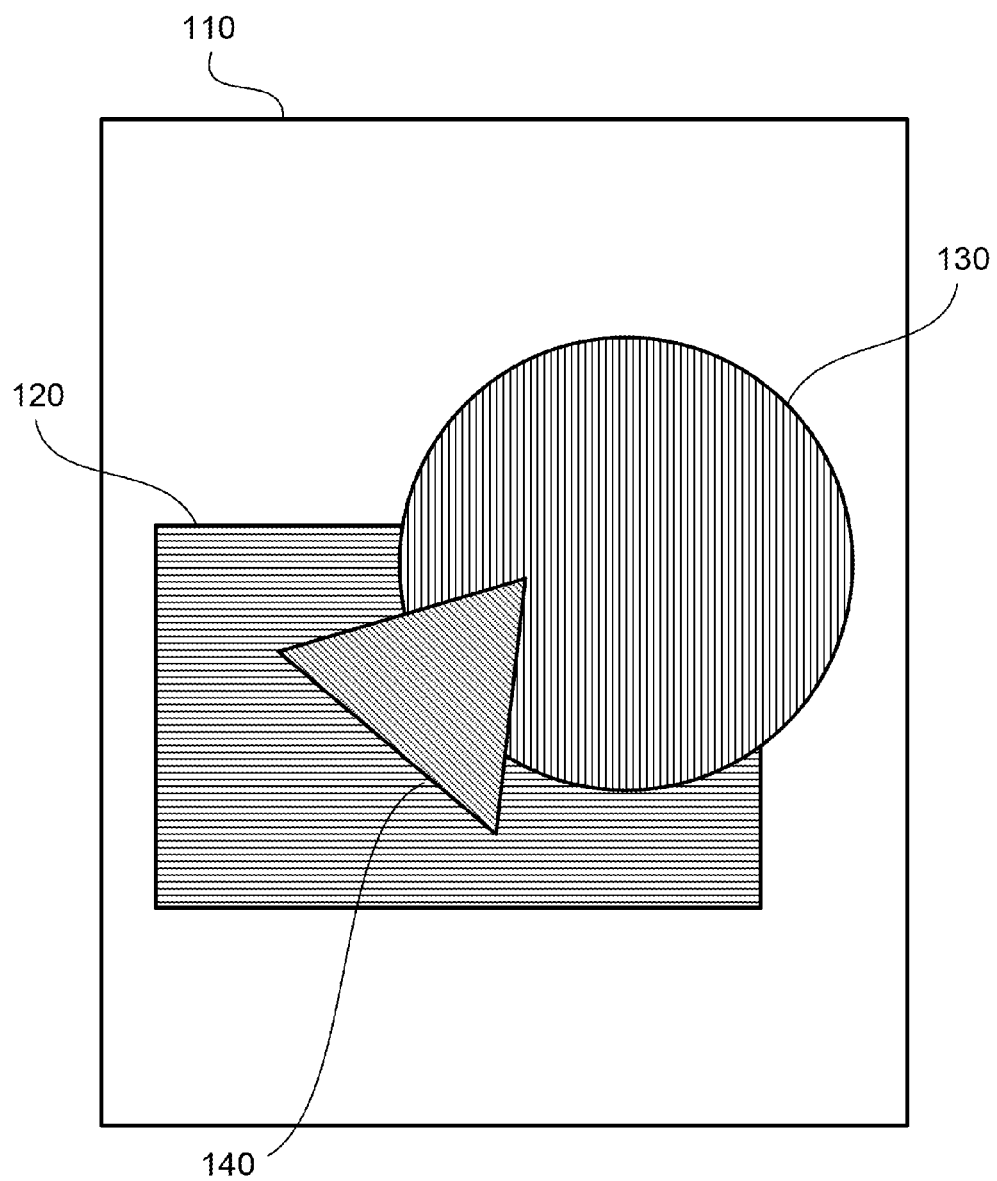
FIG. 1 shows a representation of a page containing graphic objects to be rendered to pixels.

A representation of a page 110 containing graphic objects to be rendered to pixels in accordance with the present disclosure is shown in FIG. 1. The page 110 contains three graphic objects 120, 130 and 140. The first graphic object 120 is a rectangle with a horizontally hatched fill. This graphic object 120 is opaque. The second graphics object 130 is a circle with vertically hatched fill. This graphic object 130 is translucent and partially overlaps the rectangle 120. The z-value of the circle 130 is higher than the z-value of the rectangle 120 and therefore partially obscures the rectangle 120. The third graphic object 140 is a triangle with a diagonally hatched fill. This graphic object 140 is opaque. The triangle 140 lies on top of the rectangle 120, and partially overlaps the circle 130. The z-value of the triangle 140 is higher than the z-values of the rectangle 120 and the circle 130. Therefore, the triangle 140 partially obscures the rectangle 120 and the circle 130.

Figure 2:
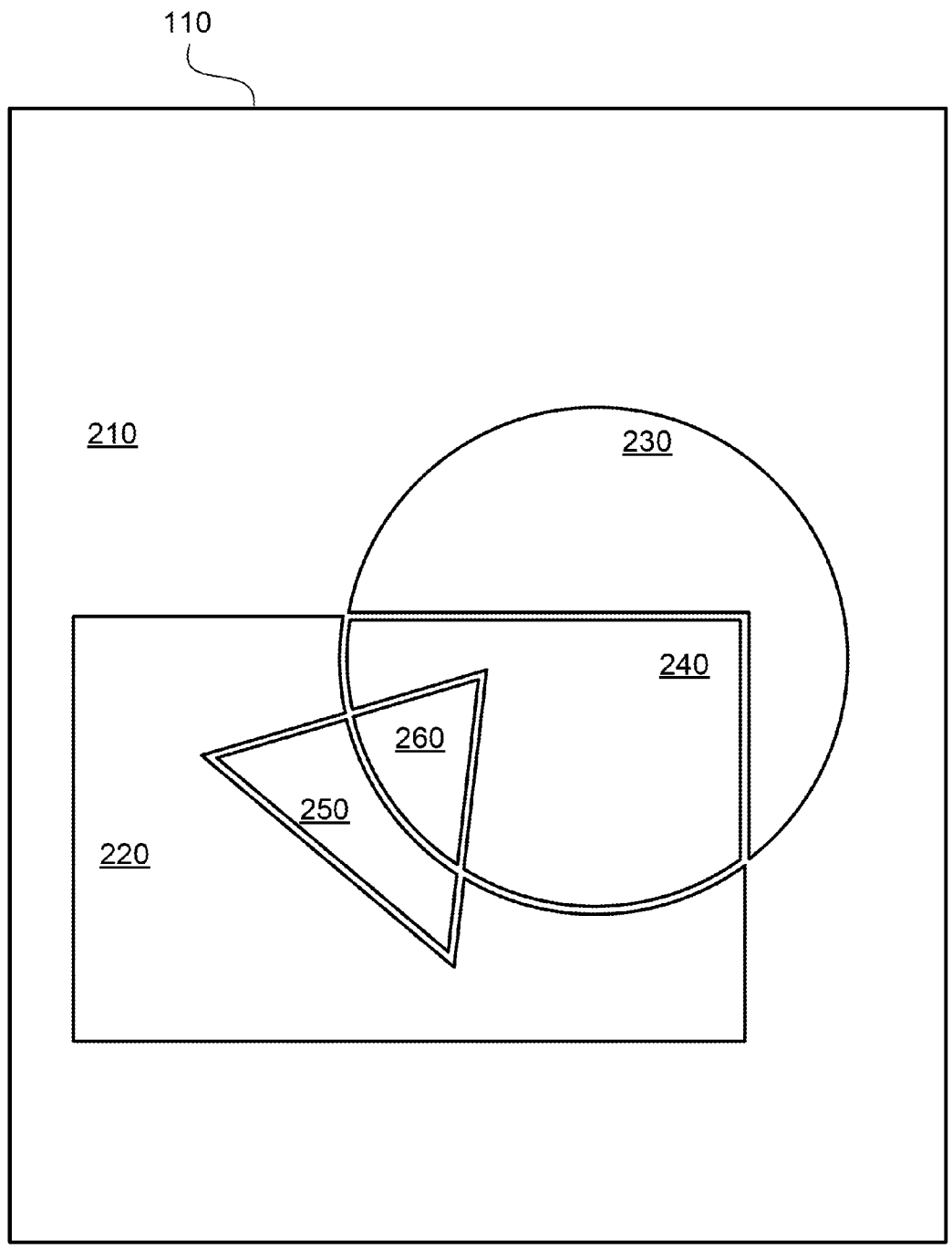
FIG. 2 shows the disjoint regions formed by the graphic objects of the representation of the page shown in FIG. 1.

Disjoint regions formed by the combination of the graphic objects 120, 130 and 140 on the page 110 are shown in FIG. 2. A disjoint region may be identified as a portion of the page to be rendered which is homogenous with respect to graphic objects that overlap the region. If a graphic object overlaps a disjoint region, then that graphic object is defined as being active within the region. Each disjoint region is bounded by object edges that have been derived from the outlines of graphic objects or the page boundaries. These object edges may be edges composed of Bezier splines, straight line segments, or pixel aligned edges that are aligned to pixel boundaries.

There are six disjoint regions of the page 110, as shown in FIG. 2. These include a background region 210 where no graphic objects are active, a region 220 where the rectangle 120 is the only active graphic object, a region 230 where the circle 130 is the only active graphic object, a region 240 where the rectangle 120 and the circle 130 are active, and region 250 where the rectangle 120 and the triangle 140 are active. Finally, there is a region 260 where all three graphic objects 120, 130 and 140 are active.

Figure 3:
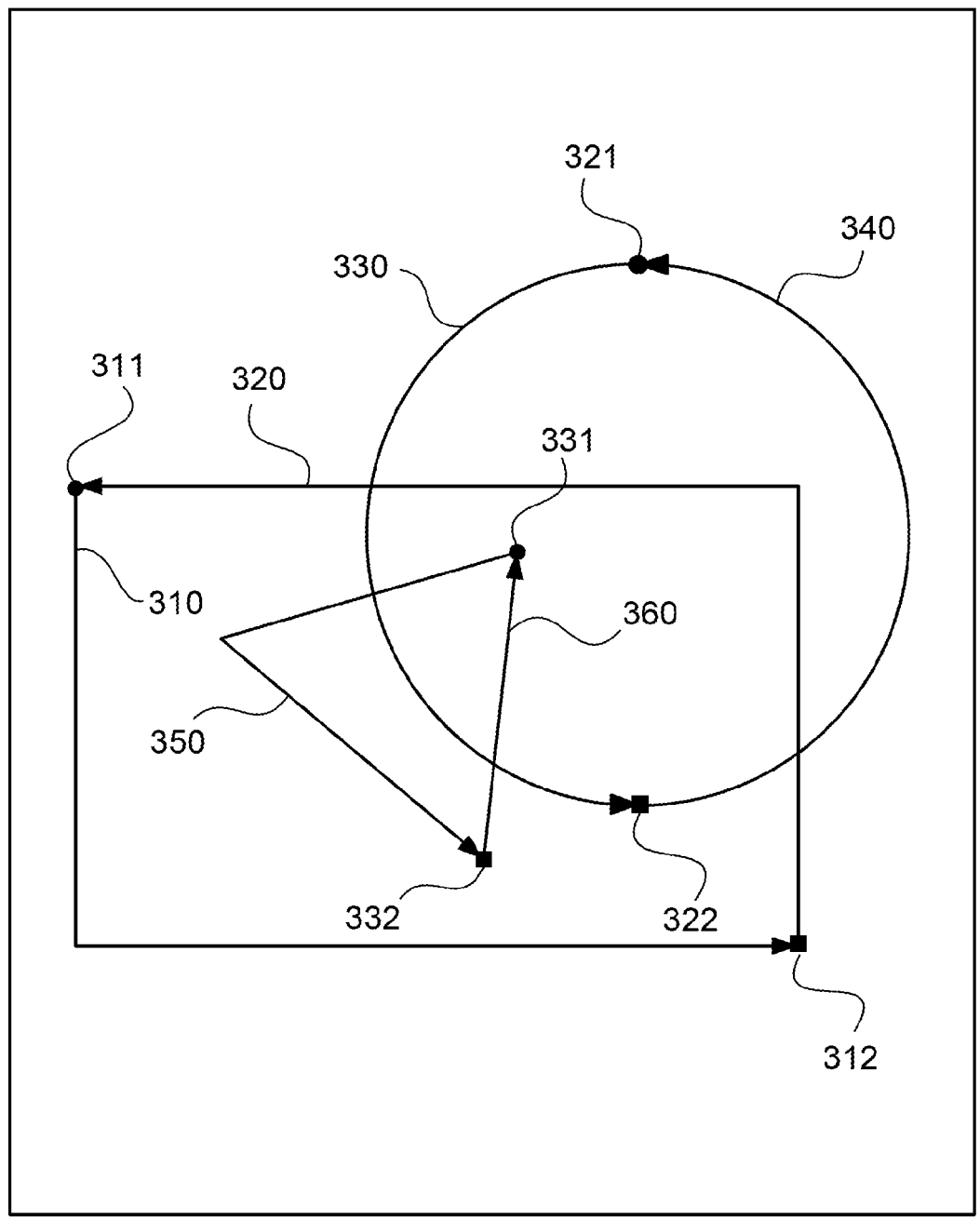
FIG. 3 shows the object edges for the graphic objects represented in FIG. 1.

The object edges for the graphic objects represented in FIG. 1 are shown in FIG. 3. These object edges are monotonic in the y direction. These object edges are derived by the processor 1470 from the outlines that define the boundaries of each of the graphic objects represented in FIG. 1. The rectangle 120 is decomposed into two object edges 310 and 320. These object edges 310 and 320 have a common starting point 311 and a common end point 312. The circle 130 is decomposed into two object edges 330 and 340. These object edges 330 and 340 have a common starting point 321 and a common end point 322. The triangle 140 is decomposed into two object edges 350 and 360. These object edges 350 and 360 have a common starting point 331 and a common end point 332. Object edges activate the graphic object from which they were derived when the object edge is traversed from the region bounded by the object edge that is outside of the graphic object to region on the other side of the object edge that lies within the graphic object. In a preferred implementation these object edges are pixel aligned object edges. Object edges may, however, be edges composed of Bezier splines or straight line segments. Note that object edges start and end in pairs.

Figure 4:
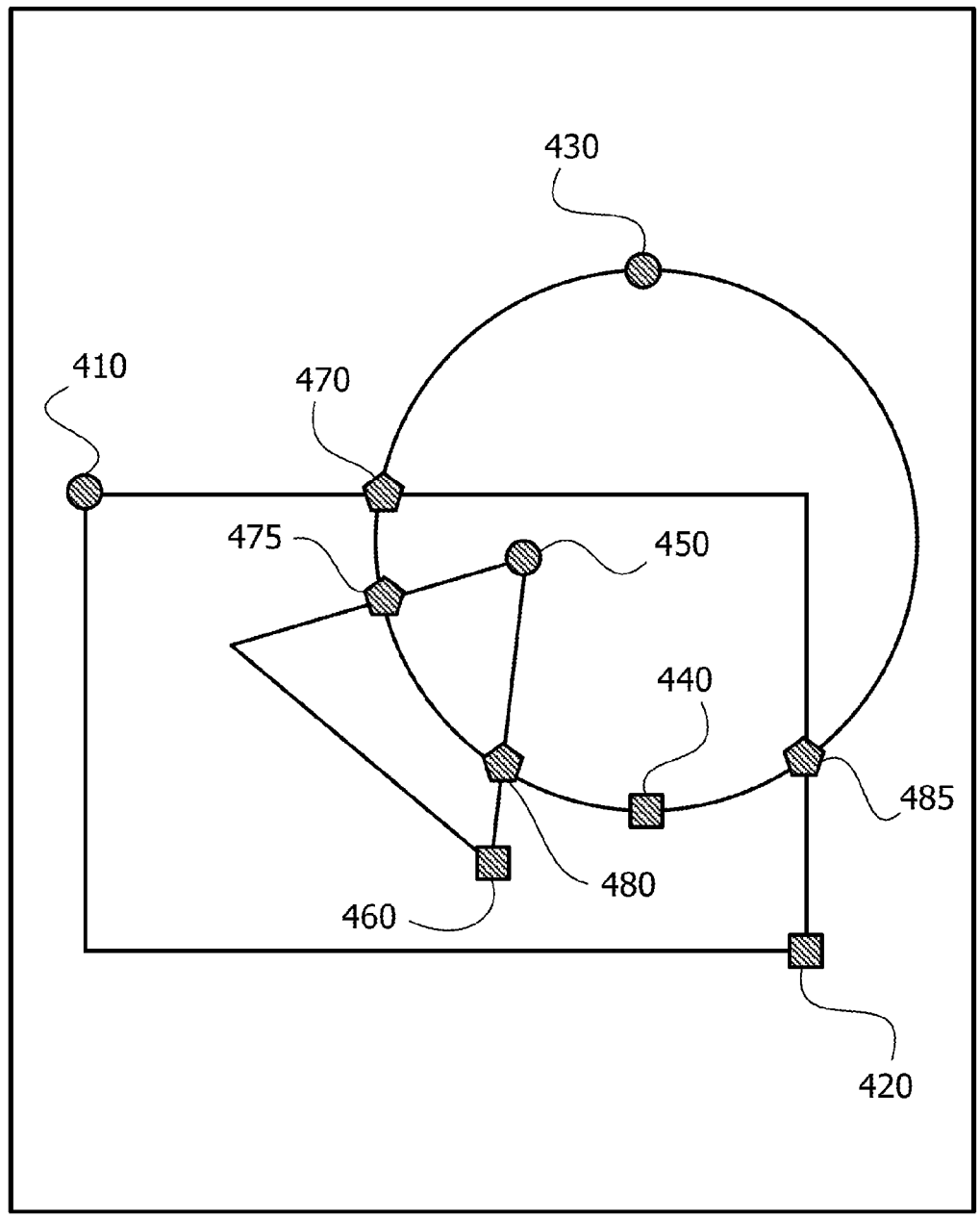
FIG. 4 shows the object start points, object end points and object intersection points for the graphic objects represented in FIG. 1.

The object start points, object end points and object intersection points are shown in FIG. 4 for the graphic objects 120, 130 and 140 represented in FIG. 1. Graphic objects have one or more object start points. Each object start point defines the start point of a pair of object edges. The start points for the graphic objects 120, 130 and 140 represented in FIG. 1 are shown in FIG. 4 as hatched circles 410, 430 and 450, respectively. Similarly, graphic objects have one or more object end points. Each object end point defines the end point of a pair of object edges. The end points for the graphic objects 120, 130 and 140 represented in FIG. 1 are shown in FIG. 4 as hatched squares 420, 440 and 460, respectively. An object intersection point (also known simply as an intersection point) is created when object edges intersect. Object intersection points marking where the object edges of the graphic objects 120, 130 and 140 represented in FIG. 1 intersect are shown in FIG. 4 as hatched pentagons 470, 475, 480 and 485.

The object start points, object end points and object intersection points are identified and used to generate a graph of regions. The graph of regions is an abstract representation of the regions of homogenous object activity on the page. A region of homogenous object activity is also known as a disjoint region. The graph of regions is composed of nodes and links. Each node represents a region of homogenous object activity on the page. Nodes in the graph of regions will be referred to as region graph nodes. Each link in the graph of regions is a link joining neighbouring region graph nodes. The change in the active level list that is required when traversing between neighbouring region graph nodes is encoded in the link joining the two region graph nodes. An active level list is a list containing a reference to each of the levels corresponding to the objects that are active within a disjoint region corresponding to a region graph node within the graph of regions. The change in the active level list is an instruction for the processor 1470 to either insert a level into the active level list, or remove a level from the active level list, when traversing from a first region graph node in the graph of regions to the first region graph node's neighbour along the link. Links in the graph of regions will be referred to as region graph links.

Each level within a sequence of contributing levels corresponds to a graphic object on the page to be rendered. A level specifies the z-value of the graphic object, the fill that is used to derive the colour of the graphic object, and the operator that is used to combine the graphic object with other overlapping graphic objects. All of the levels within a sequence of contributing levels for a region contribute in some way to the colour of each of the pixels within the region.

Figure 5:
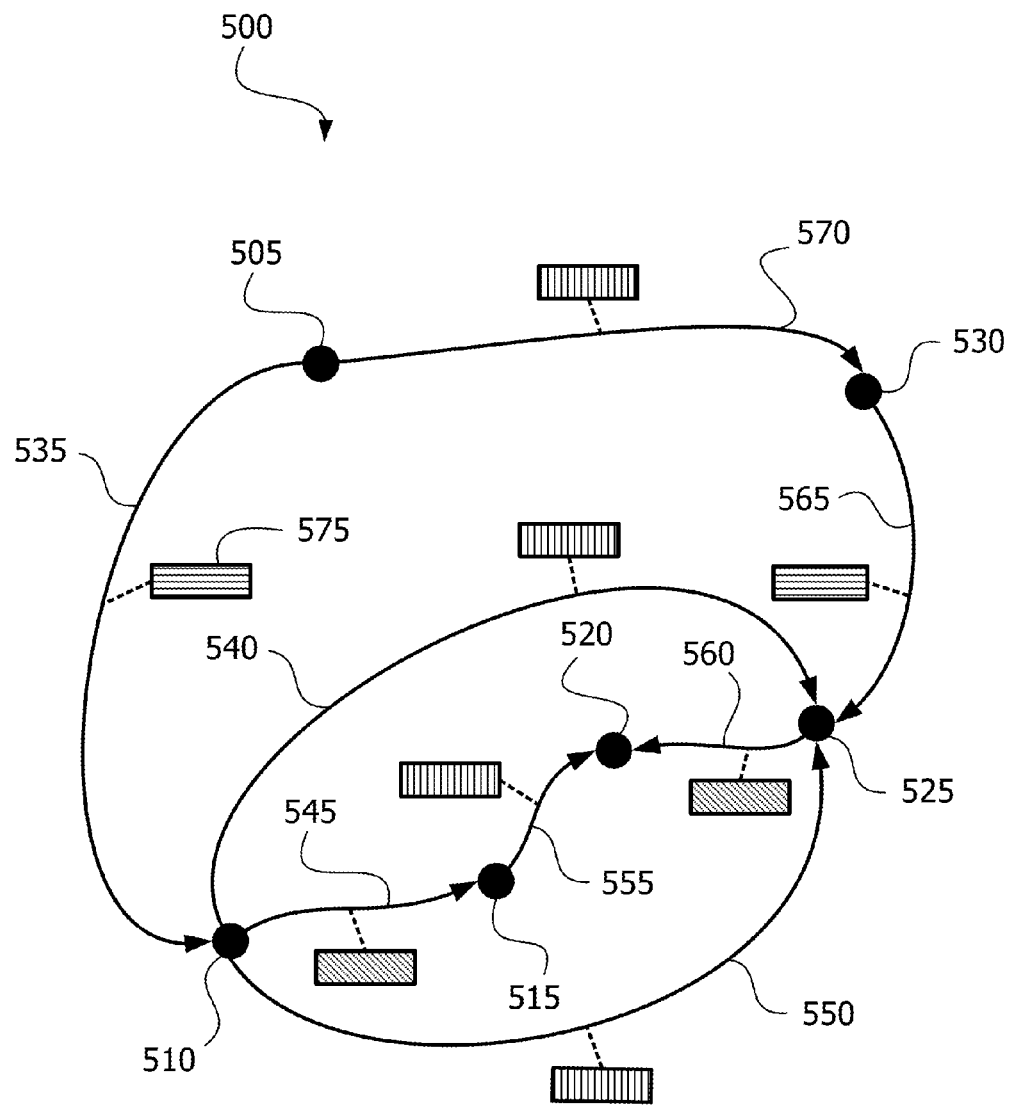
FIG. 5 shows a graph of regions for the page containing the graphic objects represented in FIG. 1.

A graph of regions 500, or simply a "region graph", for the page 110 containing graphic objects 120, 130 and 140, is shown in FIG. 5. The region graph 500 comprises six region graph nodes 505, 510, 515, 520, 525 and 530. The graph of regions 500 also comprises eight region graph links 535, 540, 545, 550, 555, 560, 565 and 570. These region graph links join neighbouring region graph nodes within the graph of regions 500. Each region graph link contains a reference to a level to be inserted into, or removed from, the active level list when traversing from a first region graph node in the graph of regions 500 to the first region graph node's neighbour. Levels are inserted into the active level list according to the arrow direction of each of the region graph edges 535, 540, 545, 550, 555, 560, 565 and 570 shown in FIG. 5. For example, a first region graph node 505 is used to represent the background pixels. A second region graph node 510 is used to represent the pixels where only the horizontally hatched rectangle 120 is active. These region graph nodes 505 and 510 are joined by a region graph link 535. The level 575 corresponding to the horizontally hatched rectangle 120 is referenced by the region graph link 535. The direction of the arrow representing the region graph link 535 indicates that the level 575 corresponding to the horizontally hatched rectangle 120 is inserted into the active level list as the graph of regions 500 is traversed from the first region graph node 505 to the second region graph node 510. Conversely, the level 575 corresponding to the horizontally hatched rectangle 120 is removed by the processor 1470 from the active level list when the graph of regions 500 is traversed from the second region graph node 510 to the first region graph node 505. The region graph 500 operates to define the particular relationship between the region 220-260 shown in FIG. 2. The approaches disclosed here operate to update (i.e. activate and deactivate) levels for objects as regions are traversed in a rendering of the graphical objects as expressed in the region graph.

Figure 6:
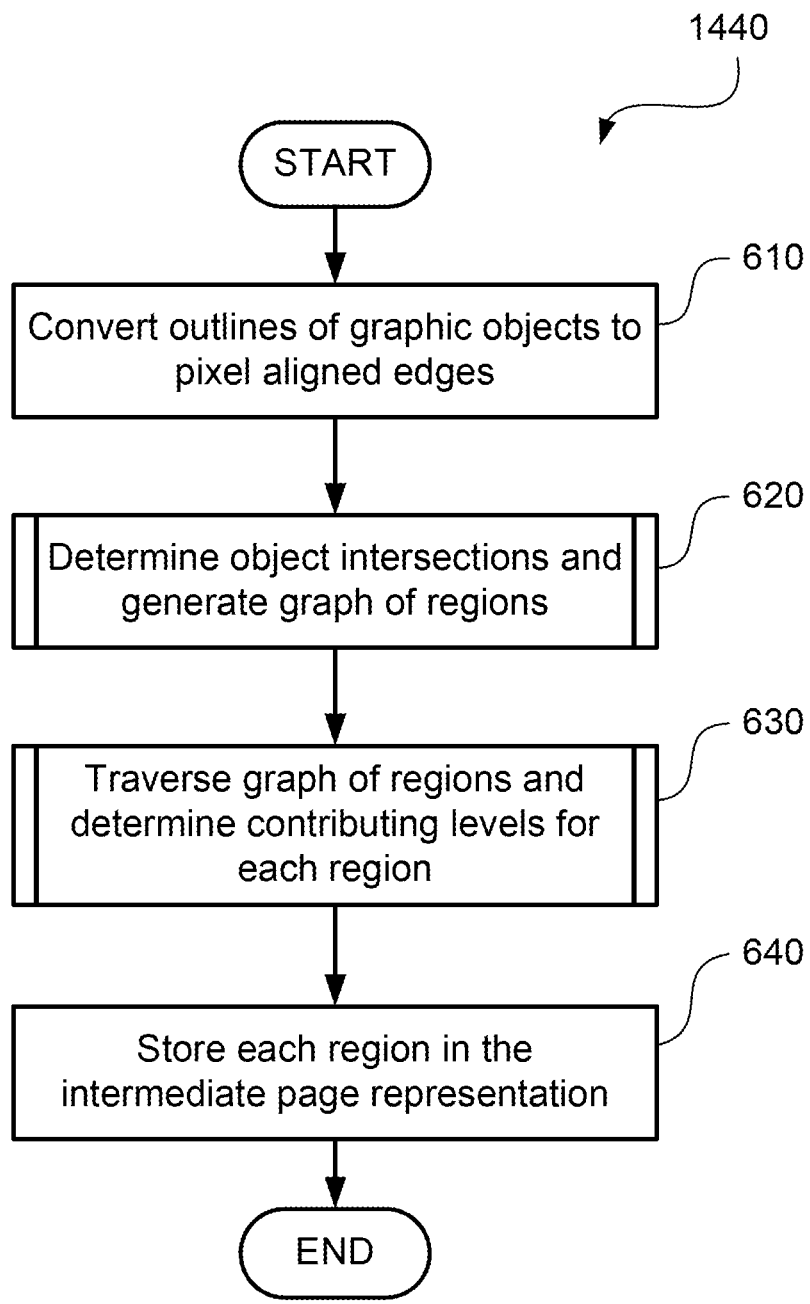
FIG. 6 shows a flow chart of the method performed by the Controlling Program for processing a page of graphic objects to generate an intermediate page representation according to the present disclosure.

A flow chart of the method performed by the Controlling Program 1440 for generating an intermediate representation of a page to be rendered to pixels according to the present disclosure is shown in FIG. 6. The Controlling Program 1440 starts and proceeds to step 610 where the outlines of each graphic object to be rendered are converted to pixel aligned object edges. The process of converting the outlines of graphic objects to pixel aligned object edges includes vectorising the graphic object outlines and generating object edges composed of line segments that are monotonic in the y direction of the page. These object edges are tracked on a scan line basis to determine the x intersections of each of the object edge's line segments with each scan line on which the object edge is active. The x intersections for each object edge are aggregated to form a pixel aligned object edge.

Next, the Controlling Program 1440 in the processor 1470 proceeds to step 620 where object intersections are determined and a graph of regions is generated for the page of graphic objects to be rendered. The step 620 of determining object intersections and generating a graph of regions will be described later with reference to FIG. 12 and FIG. 9 in accordance with the first and second exemplary implementations, respectively.

Next, the Controlling Program 1440 in processor 1470 proceeds to step 630 where the graph of regions is traversed and a list of contributing levels for each region is determined. The step 630 of traversing the graph of regions and determining the list of contributing levels for each region of the page will be described later with reference to FIG. 7.

Next, the Controlling Program 1440 proceeds to step 640 where each region is stored in the intermediate page representation. The step 640 of storing each region in the intermediate page representation includes storing the list of contributing levels, together with the portions of the pixel aligned object edges that define the region boundaries and the fills and other data required to render the region to pixels, for each region to form the intermediate page representation.

The step 620 of determining object intersections and generating a graph of regions according to a first exemplary implementation will now be described with reference to FIGS. 10a to 13. In the first implementation, a graph of edges is generated for the page to be rendered. The graph of edges is subsequently used to generate the graph of regions for the page. A graph of edges is an abstract representation of the page to be rendered. The graph of edges comprises the object edges of the graphic objects on the page, and the intersection points of these object edges. The process of finding the intersection points of object edges will be described later with reference to FIG. 13.

Figure 10A:
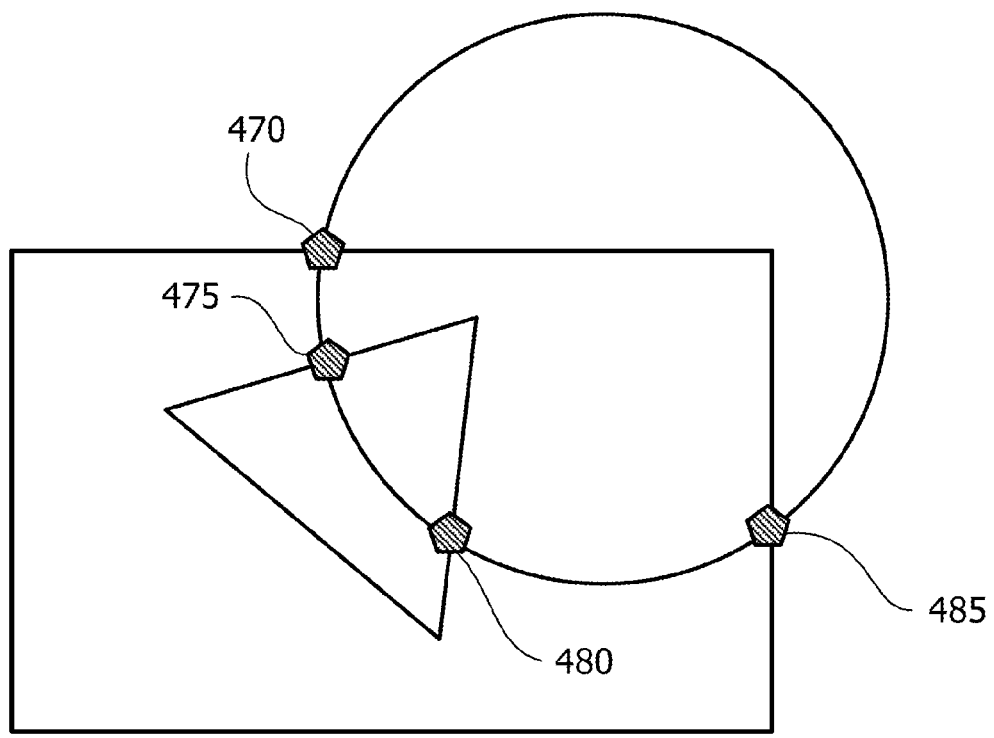
FIG. 10a shows the outlines of the graphic objects represented in FIG. 1 and the intersection points of the object edges belonging to these graphic objects.

FIG. 10a shows the outlines of the graphic objects 120, 130 and 140, and the intersection points 470, 475, 480 and 485 of the object edges belonging to these graphic objects. In the first implementation, these intersection points and the portions of the object edges that lie between these intersection points are used to generate a graph of edges.

A graph of edges is a graph composed of intersection points and edges. Each intersection points in the graph of edges corresponds to the intersection points of two or more object edges and can also be referred to as an edge graph node. Each edge in the graph of edges represents a portion of one or more objects edges that lies between two neighbouring intersection points and will be referred to as an edge graph edge. Edge graph edges are used to connect neighbouring edge graph nodes.

Figure 10B:
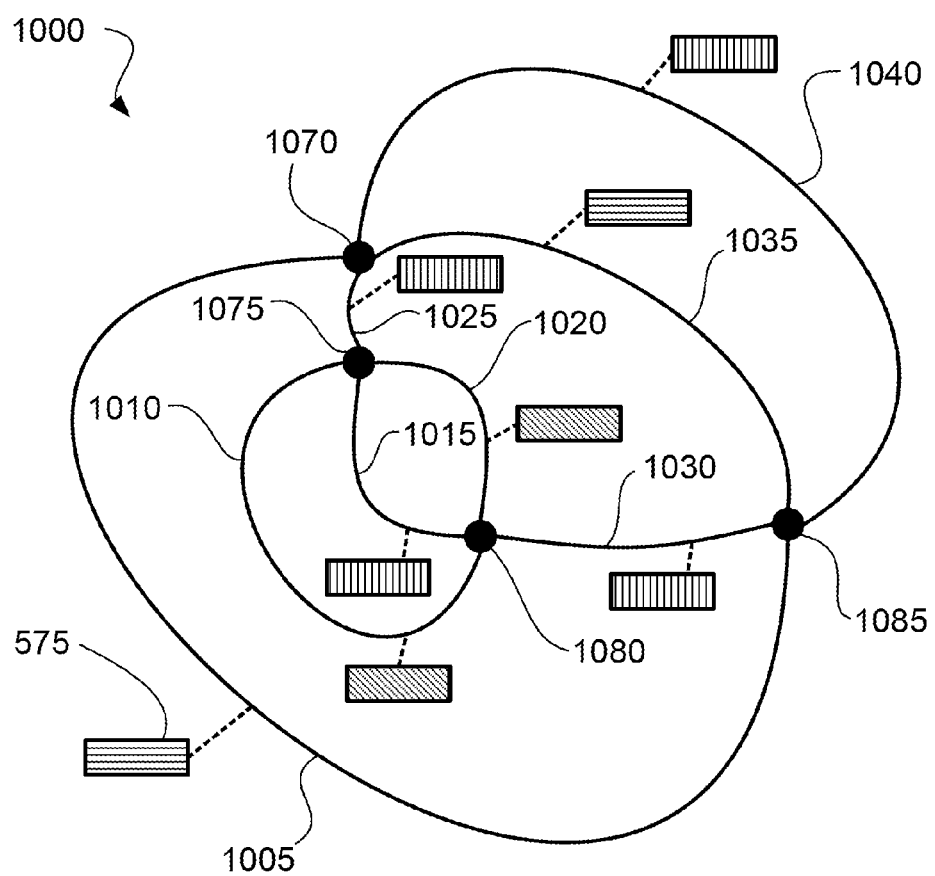

FIG. 10b shows the graph of edges 1000 generated from the object edges of the graphic objects 120, 130 and 140, and the intersection points shown in FIG. 10a. This graph of edges 1000 has four edge graph nodes 1070, 1075, 1080 and 1085. Edge graph node 1070 corresponds to intersection point 470, edge graph node 1075 corresponds to intersection point 475, edge graph node 1080 corresponds to intersection point 480, and edge graph node 1085 corresponds to intersection point 485.

An edge graph edge also represents the activation or deactivation of the level associated with the portion of the object edges associated with the edge graph edge as the edge is traversed from the face that lies to the left of the edge graph edge, to the face that lies to the right of the edge graph edge. Each edge graph edge is therefore assigned a reference to the level corresponding to the object edges associated with the edge graph edge. For example, an edge graph edge 1005 corresponds to the portions of the object edges 310 and 320 of the rectangle 120 between intersection points 470 and 475 derived from the intersection of the object edges 310 and 320 belonging to the rectangle 120 and the object edges 330 and 340 belonging to the circle 130. This edge graph edge 1005 is assigned a reference to the level 575 that is associated with rectangle 120. The remaining edge graph edges 1010, 1015, 1020, 1025, 1030, 1035 and 1040 are similarly assigned levels as shown in FIG. 10b.

A level activation occurs when a graphic object is entered and the level of the graphic object comes into effect. A level activation results in the insertion of the level into the active level list during the edge traversal. A level deactivation occurs when a graphic object is exited and its level no longer has an effect. A level deactivation results in the removal of a level from the active level list during the edge traversal.

The graph of edges is an abstract representation of the intersections of object edges of the graphic objects to be rendered, and the connections between these intersection points. As the graphic objects and their object edges divide the 2-D page into disjoint regions or faces, the graph of edges is an embedding of a planar graph G in the 2-D plane. One operation that can be performed on a planar graph G is the computation of a dual G* corresponding to the planar graph G. The dual graph G* of a given planar graph G is a graph which has a node for every face in G, and a link for every edge in G, the link joining two neighbouring faces. In other words, the dual G* of graph G has a vertex in each plane region of G, and a link for each edge in G, and the links joining neighbourhood regions. The dual graph operation is well-known to those in the fields of mathematics, computer science and engineering.

The calculation of a region graph G*, which is the dual graph derived from an embedding of a edge graph G will now be briefly described. The following description describes one method of calculating a dual graph G*. Various methods of calculating a dual graph are known in the art.

As mentioned previously, each node in a dual of an edge graph G corresponds to a face of edge graph G. Nodes in the dual graph are therefore found by finding faces in the graph G. The edges of each edge graph node in G which divides neighbourhood regions are first sorted in a predetermined direction. In an exemplary implementation, the edges in edge graph G are sorted in a clockwise order. Next, the edges in the graph G are traversed, where the transition from the current edge to the next edge is made by finding the next clockwise edge at the node where the current and the next edges meet. This process finds cycles around faces in the graph G, which correspond to nodes in the dual graph G*. A dual (region) graph node is added by the processor 1470 for each of these cycles, and dual graph nodes are assigned to the region having an appearance that is determined by the edge of edge graph G in the direction that the edge is traversed. Once all cycles of G have been found (each edge of G has been visited in both directions), each edge in G will be associated with two nodes in the dual graph G*, one for each direction that the edge was traversed in. For each edge in edge graph G, an link in the region graph G* is created, which links two nodes of the region graph that are associated with the edge in G. At this point, the dual graph has been created.

In the first implementation, the graph of regions is obtained by taking the dual of the graph of edges. The dual of the graph of edges is the graph of regions. The graph of regions is composed of region graph nodes and region graph links. A region graph node corresponds to a region or face in the graph of edges, and therefore also corresponds to a disjoint region of (possibly overlapping) graphic objects.

A region graph link corresponds to an edge graph edge, and therefore also corresponds to the activation or deactivation of a level of a graphic object. During the creation of the graph of regions (by taking the dual of the graph of edges, described previously), the contributing level associated with the edge graph edge that corresponds to a region graph edge is also assigned to the region graph link. A region graph link represents the activation or deactivation of a level when the region graph is traversed from one region graph node to another. The direction that a region graph link is traversed in order to activate a level is therefore also associated with the region graph link. If the region graph link is traversed in the other direction, the level is said to be deactivated. The traversal of a graph of regions in order to determine the list of contributing levels associated with each region will be described later with reference to FIG. 7.

Figure 11:
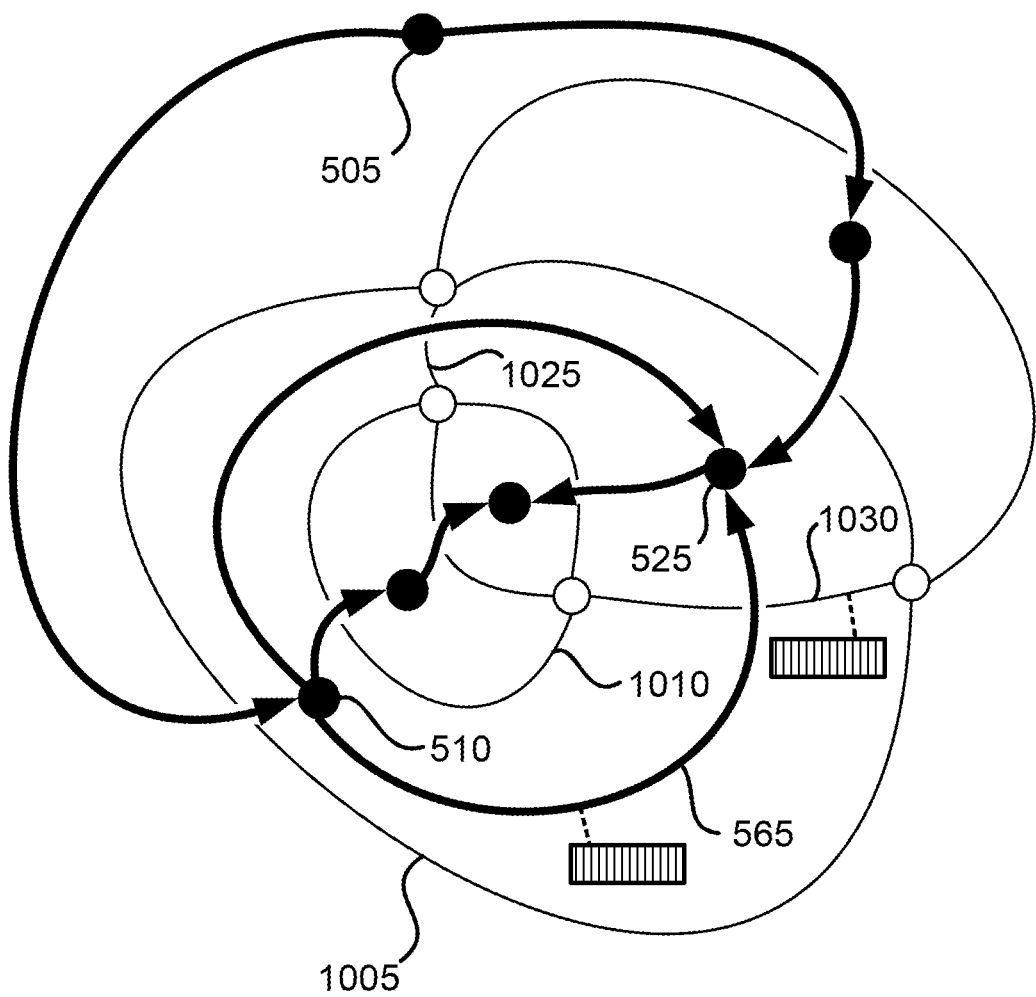
FIG. 11 shows the graph of regions generated from the graph of edges shown in FIG. 10b.

The graph of regions generated from the graph of edges shown in FIG. 10*b* will now be described with reference to FIG. 11. In FIG. 11, the region graph nodes are shown as black dots, and the region graph links are shown as thick lines. Edge graph nodes are shown as white dots, and edge graph edges are shown as thin lines.

Note that there is a region graph node for each face in the graph of edges, including the face surrounding the entire graph of edges (representing the background pixels). For example, region graph node 510 corresponds to the face in the graph of edges bounded by edge graph edges 1005, 1010, 1025 and 1030. Region graph node 505 corresponds to the face surrounding the entire graph of edges, and represents the background of all graphic objects. Also note that each region graph link crosses (and is associated with) an edge graph edge. For example, region graph link 565 is associated with edge graph edge 1030. As described previously with reference to FIG. 5, each region graph link has an associated level and an associated activating direction. In the first implementation, the level associated with a region graph link is the level that is associated with the edge graph edge that the region graph link crosses. For example, with reference to FIG. 11, region graph link 565 is assigned a reference to the level that is associated with edge graph edge 1030.

The activating direction of a region graph link can be determined by analysing the faces of the graph of edges associated with each of the region graph nodes attached to the region graph link. The activating direction of the region graph link is the direction towards the region graph node (and its associated face in the graph of edges) that is within the object edges of the graphic object to which the level of the region graph link is assigned. For example, with reference to FIG. 11, the face of the graph of edges associated with region graph node 525 is within the object edges of the graphic object to which the level associated with region graph link 565 is assigned (the level of the circle object). Therefore, the activating direction of region graph link 565 is towards region graph node 525.

Alternatively, the activating direction of a region graph link can be determined during traversal of the graph of regions. If the list of active levels associated with a region graph node being traversed from does not contain the level associated with the region graph link, the level is being activated (the graphic object is being entered). Conversely, if the list of active levels associated with a region graph node being traversed from does contain the level associated with the region graph link, the level is being deactivated (the graphic object is being exited). For example, with reference to FIG. 11, if region graph link 565 is being traversed from region graph node 510 to region graph node 525, the list of active levels at region graph node 510 will not contain the level associated with region graph link 565. Therefore, region graph link 565 is being traversed in the activating direction. Conversely, if region graph link 565 is being traversed from region graph node 525 to region graph node 510, the list of active levels at region graph node 510 will contain the level associated with region graph link 565. Therefore, region graph link 565 is being traversed in the deactivating direction.

As with the graph of edges, the graph of regions is an abstract representation. The purpose of the graph of regions is to represent the connections between region graph nodes in the graph of regions and the changes in the active level list between the regions corresponding to these region graph nodes, so that the appearance of each region can be determined in an efficient manner.

Figure 12:
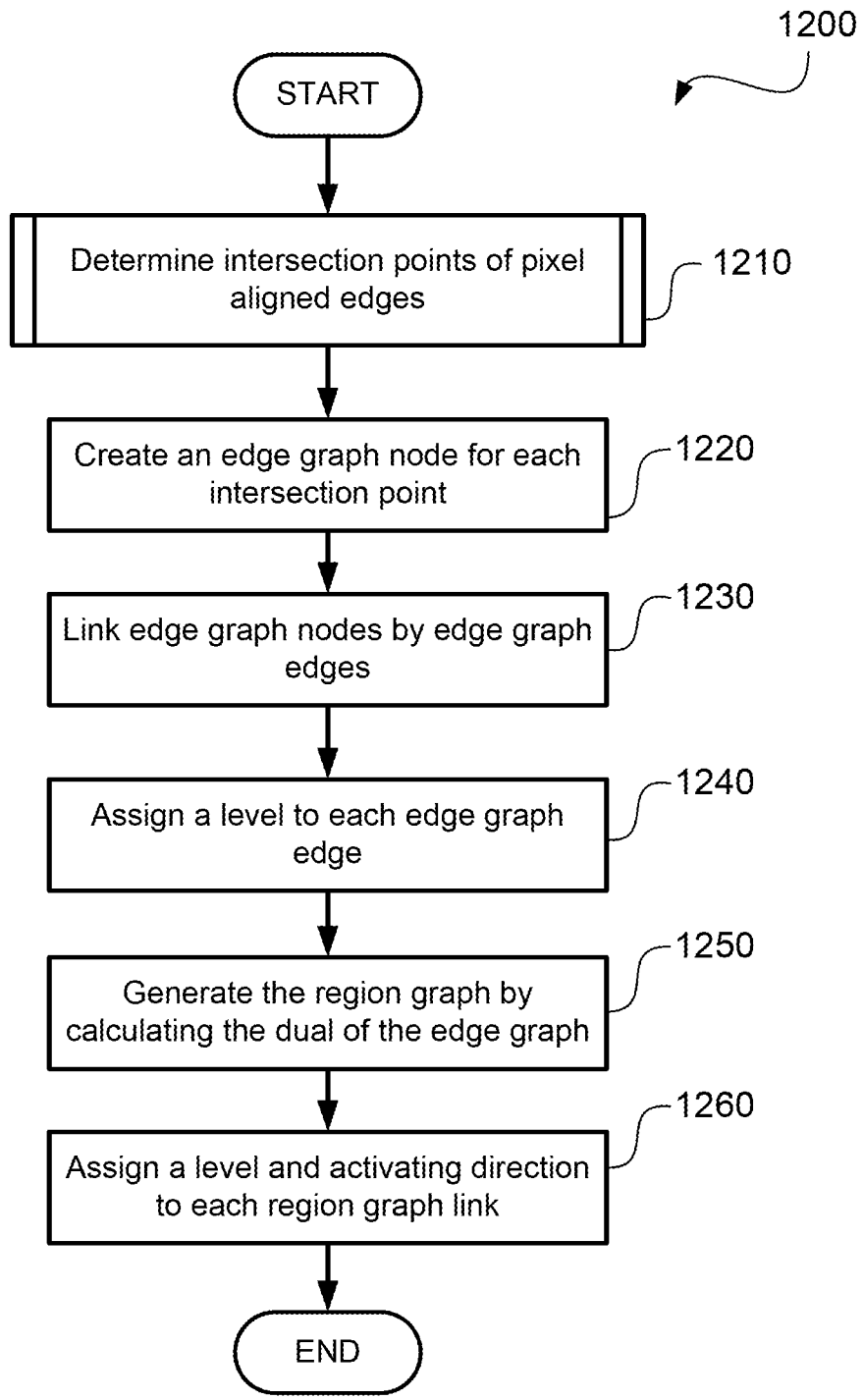
FIG. 12 shows the process of determining intersection points and generating the graph of regions.

A process 1200 of generating the graph of regions according to the first implementation will now be described with reference to FIG. 12. This process 1200 is a method of performing the sub-process 620 with reference to FIG. 6 according to the first implementation. Prior to the beginning of process 1200, the object edges have been converted to pixel aligned edges (see FIG. 6). The process 1200 starts and proceeds to step 1210 where the intersection points of the pixel aligned object edges are determined. The process of determining the intersection points of pixel aligned object edges will be described later with reference to FIG. 13.

Processing then proceeds to step 1220, where an edge graph node is created for each intersection point that was determined at step 1210. An example of the correspondences between edge graph nodes and intersection points was described previously with reference to FIG. 10. Processing then proceeds to step 1230, where the edge graph nodes created at step 1220 are linked by edge graph edges. As described previously with reference to FIG. 10, an edge graph edge represents a portion of one or more object edges between intersection points. An example of the correspondences between edge graph edges and the portions of object edges between intersection points was described previously with reference to FIG. 10.

Processing then proceeds to step 1240, where a level is assigned to each edge graph edge. As described previously with reference to FIG. 10, the level assigned to an edge graph edge is the level assigned to the object edges associated with the edge graph edge. At this point, the graph of edges is complete.

Processing then proceeds to step 1250, where the graph of regions is generated by calculating the dual of the graph of edges. The dual of a planar graph embedded in the 2-D plane is a graph which has a node in each plane region of the planar edge graph, with links of the dual graph (region graph) joining neighbourhood regions of the edge graph. The calculation of the dual is a well-known operation, and was described previously with reference to FIG. 11. The graph of regions represents the links between disjoint regions of (possibly overlapping) graphic objects and the transitions in levels between those regions.

Processing then proceeds to step 1260, where a level and an activating direction is assigned to each region graph link in the graph of regions that was generated previously at step 1250. The level and activating direction are determined based on the graph of edges used to generate the graph of regions, as described previously with reference to FIG. 11. The level and activation direction associated with an edge determines the appearance of the rendered region associated with the region graph link. By activating or deactivating a particular level along the link, a resultant compositing stack for the region associated with the end node of the link is produced.

Upon completion of step 1260, the graph of regions is complete and process 1200 terminates.

Figure 13:
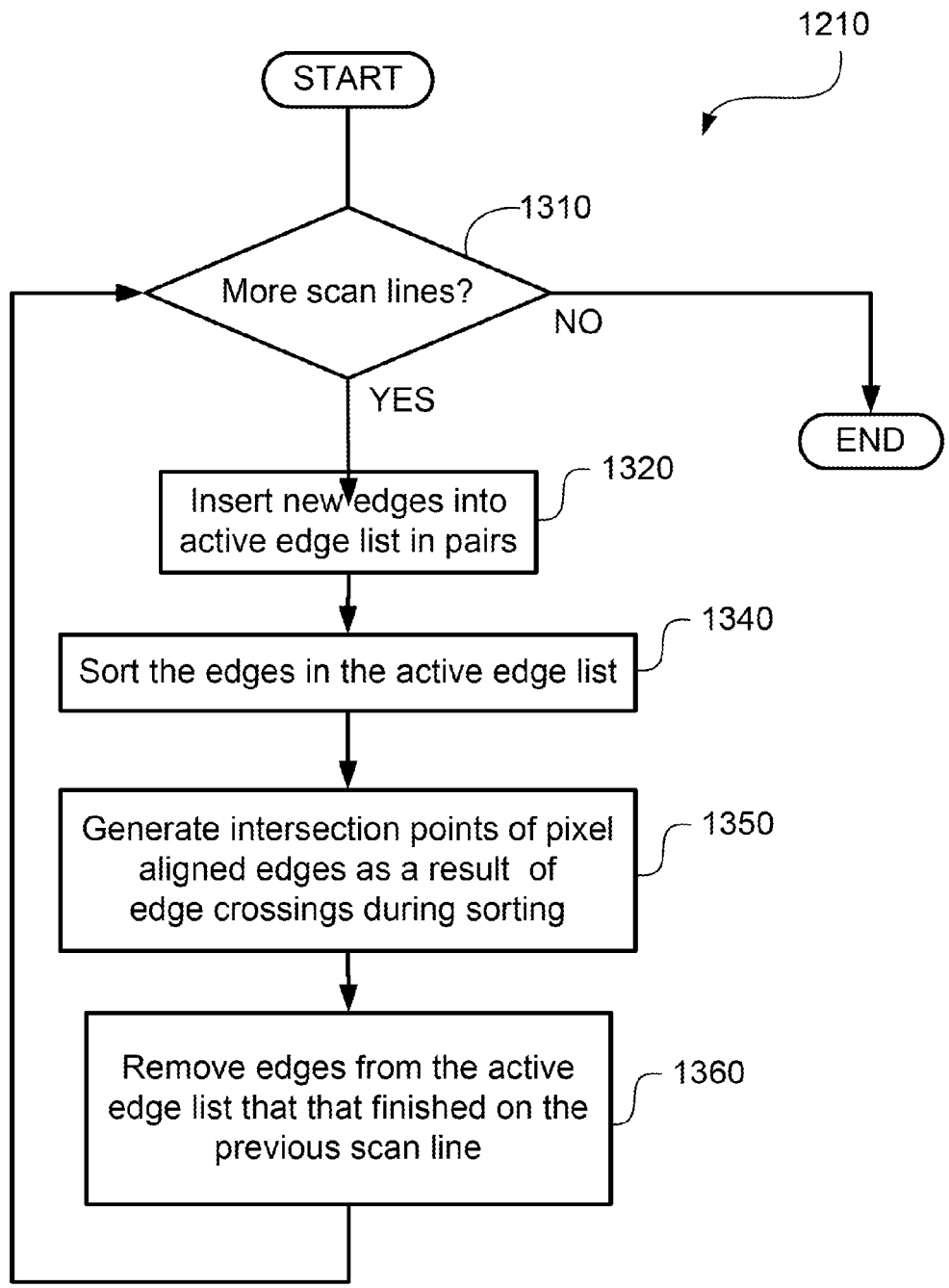
FIG. 13 shows the process of determining intersection points for overlapping graphic objects.

The process 1210 of determining intersection points of overlapping graphic objects according to a first implementation will now be described with reference to FIG. 13. The process 1210 starts and immediately proceeds to sub-step 1310 where it is determined if there are more scan lines to be processed in the page to be rendered. Initially, all the scan lines in the page need to be processed, and processing proceeds from the topmost scan line in the page, through to the bottommost scan line.

Figure 8A:
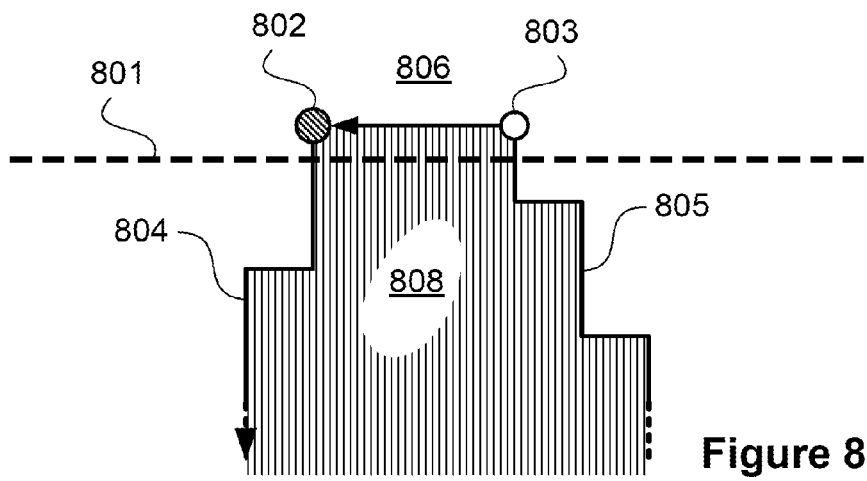
FIG. 8a shows a pair of pixel aligned object edges starting on a scan line.

If it is determined that there are more scan lines to be processed, the process 1210 proceeds to sub-step 1320 where new pixel aligned object edges are inserted by the processor 1470 into the list of pixel aligned object edges that are active on the current scan line. The list of pixel aligned object edges that are active on the current scan line is known as the active edge list. On any given scan line, the pixel aligned object edges in the active edge list are sorted in ascending order of the intersection of each edge with the current scan line. Pixel aligned object edges in a pair are inserted into the active edge list at position in the list corresponding to a common start position for the two edges in the pair. As an example, a pair of pixel aligned object edges 804 and 805, starting on a current scan line 801, is shown in FIG. 8a. In this example, the edges 804 and 805 are inserted by the processor 1470 into the active edge list at a position in the list corresponding to the common starting position 802 of the pair of edges 804 and 805.

Figure 8B:
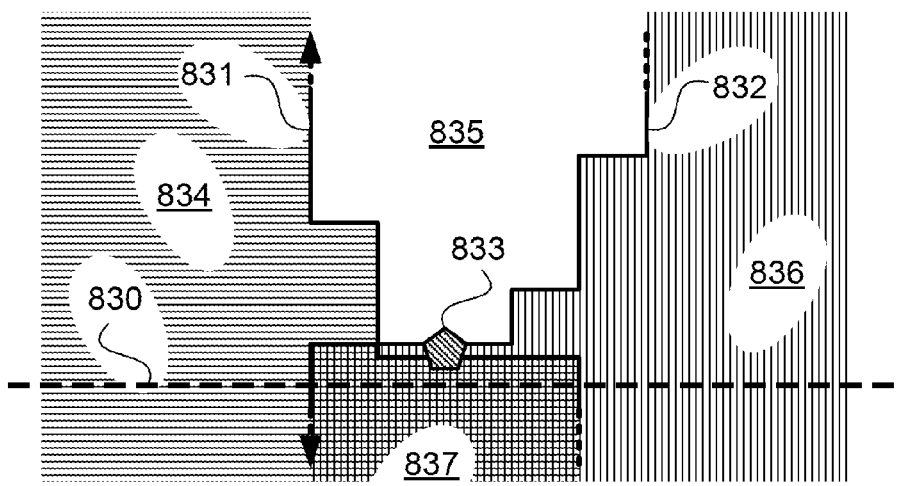
FIG. 8b shows two pixel aligned object edges crossing on a scan line.

After inserting new pixel aligned object edges into the active edge list, the process 1210 proceeds to sub-step 1340 where the pixel aligned object edges in the active edge list are sorted by the processor 1470 with respect to the intersection of each edge with the current scan line. The sorting includes swapping positions of pairs of pixel aligned object edges in the active edge list until all are appropriately ordered. Each swap that occurs during the sorting of pixel aligned object edges in the active edge list corresponds to an edge crossing. An example of an edge crossing is shown in FIG. 8b. In this example, two pixel aligned object edges 831 and 832 cross on the scan line 830 represented by the dashed line. The edge crossing location is marked by the hatched pentagon 833.

Next, the process 1210 proceeds to sub-step 1350 where an intersection point is generated for each edge crossing determined at the previous sub-step 1340 during edge sorting. Each intersection point is associated with the pixel aligned object edges that have crossed to produce the intersection point. This information is needed to generate edge graph edges at sub-step 1230 shown in FIG. 12.

Next, pixel aligned object edges that finished on the previous scan line are removed by the processor 1470 from the active edge list in sub-step 1360.

Returning to sub-step 1310, if it is determined by the processor 1470 that there are no more scan lines to process, the process 1210 terminates.

The output of the process 1210 is the intersection points of the object edges, and the object edges that are associated with each intersection point. For example, the intersection points of the object edges shown in FIG. 3 are shown in FIG. 10a. In the first implementation, the intersection points generated by process 1210 are used to create a graph of edges, as described previously with reference to FIG. 12.

Figure 9:
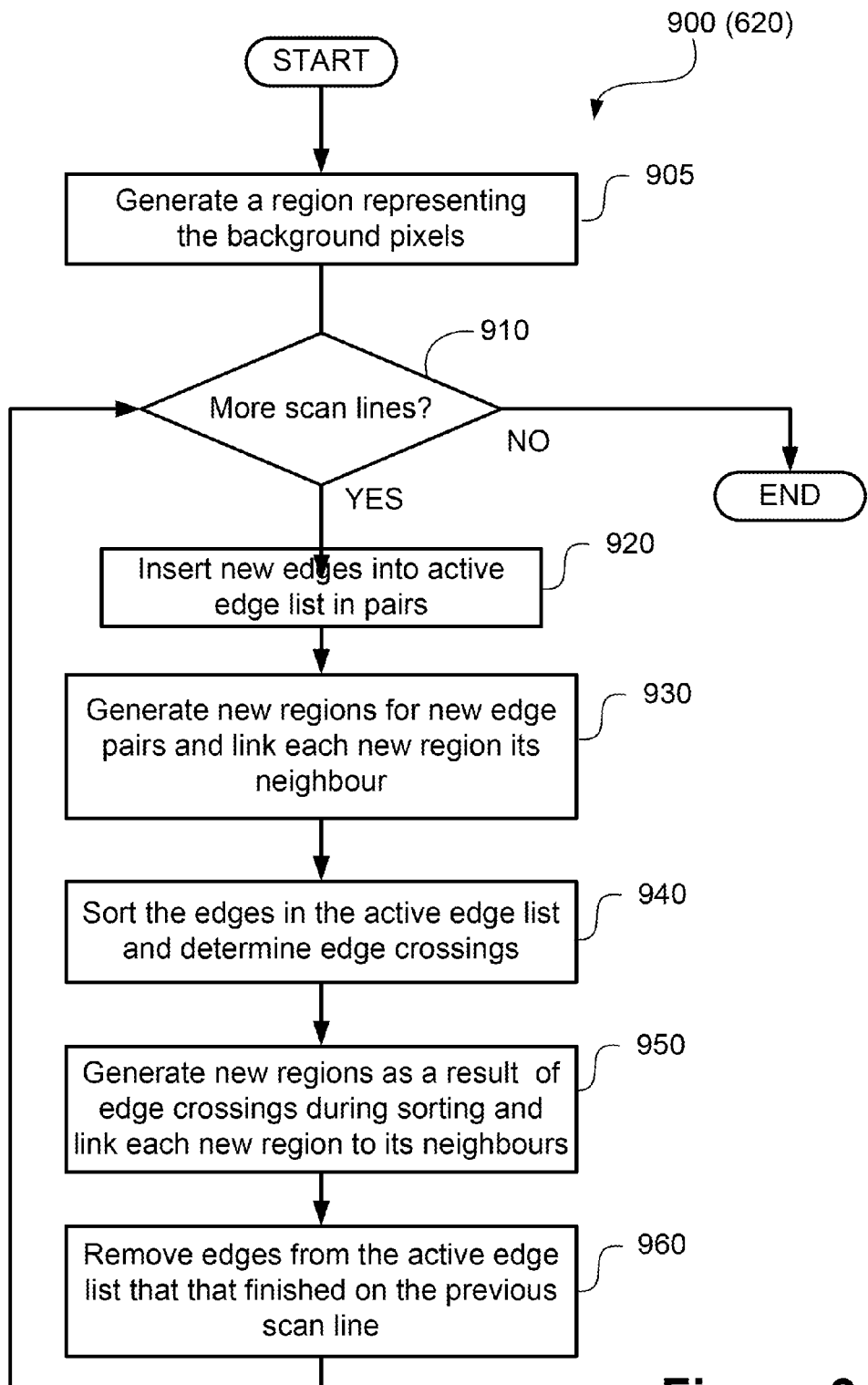
FIG. 9 shows the process of determining object intersections and generating a graph of regions for overlapping graphic objects.

The process 900 of determining object intersections and generating a graph of regions for overlapping graphic objects according to a second implementation will now be described with reference to FIG. 9. This process 900 is a method of performing the sub-process 620 shown in FIG. 6 according to the second embodiment of the present disclosure. The process 900 starts and immediately proceeds to sub-step 905 where a region graph node representing the background pixels is generated.

Next, the process 900 proceeds to sub-step 910 where it is determined if there are more scan lines to be processed in the page to be rendered. Initially, all the scan lines in the page need to be processed and processing proceeds from the topmost scan line in the page, through to the bottommost scan line. If it is determined by the processor 1470 that there are more scan lines to be processed, the process 900 proceeds to sub-step 920 where new pixel aligned object edges are inserted into the list of pixel aligned object edges that are active on the current scan line. The list of pixel aligned object edges that are active on the current scan line is known as the active edge list. On any given scan line, the pixel aligned object edges in the active edge list are sorted in ascending order of the intersection of each edge with the current scan line. Pixel aligned object edges in a pair are inserted into the active edge list at a position in the list corresponding to a common start position for the two edges in the pair. As an example, a pair of pixel aligned object edges 804 and 805, starting on a current scan line 801, is shown in FIG. 8a. In this example, the edges 804 and 805 are inserted into the active edge list at a position in the list corresponding to a common starting position 802 for the pair of edges 804 and 805.

After all the new edges starting on the current scan line have been inserted into the active edge list, the process 900 proceeds to sub-step 930 where a new region graph node is generated for each new pair of pixel aligned object edges. For any pair of pixel aligned object edges, the new region graph node that is generated corresponds to the region of pixels that lies between the pair of pixel aligned object edges on the current scan line, and possibly subsequent scan lines. Each new region graph node is subsequently linked to an existing region graph node that forms the new region graph node's immediate neighbour within the graph of regions using a region graph link. The change in the active level list that is required when traversing between each set of neighbouring region graph nodes is encoded in the region graph link joining the two region graph nodes. As an example, for the pair of pixel aligned object edges 804 and 805 shown in FIG. 8a, a new region graph node corresponding to the vertically hatched pixels 808 that lies between the two pixel aligned object edges 804 and 805 is created. This new region graph node is then linked to the region graph node corresponding to the background pixels 806 using a region graph link. In this example, an instruction to add the level corresponding to the hatched object to the active level list when traversing from the region graph node corresponding to the background pixels 806 to the region graph node corresponding to the hatched pixels 808 is encoded in the region graph link joining the two region graph nodes. Conversely, this instruction translates to an instruction to remove the level corresponding to the hatched object from the active level list when traversing from the region graph node corresponding to the hatched pixels 808 to the region graph node corresponding to the background pixels 806.

After generating the new region graph nodes, the process 900 proceeds to sub-step 940 where the pixel aligned object edges in the active edge list are sorted with respect to the intersection of each pixel aligned object edge with the current scan line. Again, each swap that occurs during the sorting of pixel aligned object edges in the active edge list corresponds to an edge crossing.

Also, during the sorting of pixel aligned object edges in the active edge list, new pixel aligned object edges will move to the position in the list corresponding their actual intersection with the current scan line. For example, for the pair of pixel aligned object edges 804 and 805 shown in FIG. 8a, the pixel aligned object edge 805 corresponding to the rightmost boundary of the region of hatched pixels 808 will move to the position in the list corresponding the edge's actual intersection 803 with the current scan line 801. This allows edge crossings to be registered that occur between these new pixel aligned object edges and other pixel aligned object edges between the previous scan line and the current scan line.

Figure 8C:
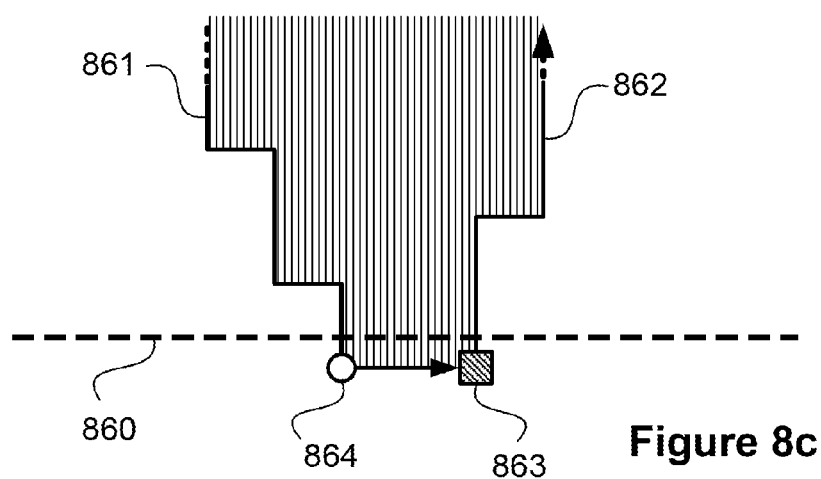
FIG. 8c shows a pair of pixel aligned object edges finishing on a scan line.

Similarly, pixel aligned object edges which finished on the previous scan line remain in the active edge list on the current scan line. This is so that edge crossings that occur between these pixel aligned object edges and other pixel aligned object edges between the previous scan line and the current scan line can be registered during sorting. A pair of pixel aligned object edges 861 and 862 is shown in FIG. 8c. In this example, the pixel aligned object edges 861 and 862 finish on the scan line 860 represented by the dashed line. On this scan line 860, the first pixel aligned object edge 861 in the pair intersects the current scan line 860 at the position marked by the white circle 864. The second pixel aligned object edge 862 in the pair intersects the current scan line 860 at the position marked by the hatched square 863. When the process 900 proceeds to the next scan line, both pixel aligned edges 861 and 862 are moved to the position marked by the hatched square 863 prior to the sorting of the active edge list. During the sorting of the active edge list, any edge crossings that would occur between the two pixel aligned edges 861 and 862 shown, and any other pixel aligned edges between what is now the current scan line and the previous scan line 860, are identified.

When the active edge list for the current scan line has been sorted and edge crossings have been determined, the process 900 proceeds to sub-step 950 where new region graph nodes are generated as a result of pixel aligned objects edge crossings identified during sorting. These new region graph nodes are linked to the existing region graph nodes that form the new region graph node's immediate neighbours using region graph links. An edge crossing is shown in FIG. 8b. In this example, two pixel aligned object edges 831 and 832 cross on the scan line 830 represented by the dashed line. The edge crossing location is marked by the hatched pentagon 833. Prior to the current scan line, the first pixel aligned edge 831 bounded a region to the left representing the horizontally hatched pixels 834 and a region to the right representing the background pixels 835. Similarly, the second pixel aligned object edge 832 bounded the region representing the background pixels 835 to the left and a region to the right representing the vertically hatched pixels 836. On the current scan line 830, a new region graph node representing the cross hatched pixels 837 is created. This new region graph node is linked to the region graph node representing the horizontally hatched pixels 834 using a region graph edge. An instruction to add the level corresponding to the vertically hatched object to the active level list when traversing from the region graph node corresponding to the horizontally hatched pixels 834 to the new region graph node representing the cross hatched pixels 837 is encoded in the region graph edge joining the two region graph nodes. This new region graph node is also linked to the region graph node representing the vertically hatched pixels 836 using a region graph edge. An instruction to add the level corresponding to the horizontally hatched object to the active level list when traversing from the region graph node corresponding to the vertically hatched pixels 836 to the new region graph node representing the cross hatched pixels 837 is encoded in the region graph link joining these two region graph nodes.

Next, pixel aligned object edges that finished on the previous scan line are removed from the active edge list in sub-step 960.

Returning to sub-step 910, if it is determined that there are no more scan lines to process, the process 900 terminates.

The output of the process 900 is graph of regions stored in the memory 1606 or 1610, where the region graph links joining the region graph nodes in the graph have an instruction to modify the active level list as the region graph nodes are traversed.

Figure 7:
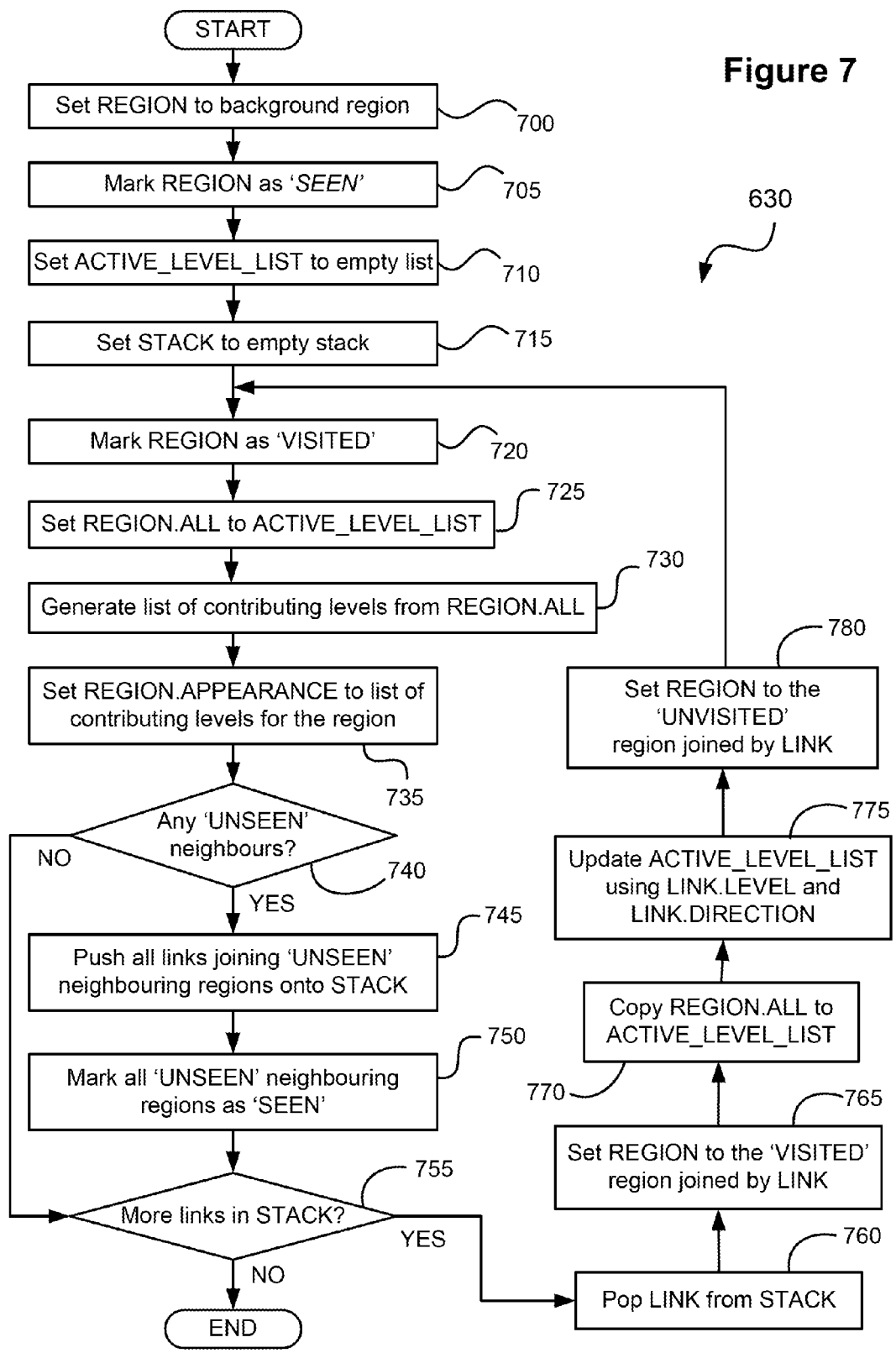
FIG. 7 shows the process of traversing the graph of regions and determining the contributing levels for each region.

The process 630 of traversing the graph of regions and determining the contributing levels for each region on the page is will be described with reference to FIG. 7. The process 630 starts and proceeds to sub-step 700 where a variable REGION, for example stored in the memory 1606, is set to the region graph node representing the region of background pixels of the page to be rendered. This region of background pixels contains no graphic objects and so the active level list is empty in the region representing these pixels. The variable REGION is used to store the current region graph node in the graph of regions for which a list of contributing levels is being determined.

Next, the process 630 proceeds to sub-step 705 where the region graph node stored in the variable REGION is marked as 'SEEN'. A region graph node is marked as 'SEEN' when the region graph node has been scheduled for processing in order to generate an active level list, and subsequently a list of contributing levels for the region graph node. Initially, all region graph nodes in the graph of regions are marked as 'UNSEEN'.

Next, the process 630 proceeds to sub-step 710 where a variable ACTIVE_LEVEL_LIST stored in the memory 1606 is initialised to or as an empty list. The variable ACTIVE_LEVEL_LIST is used to store the active level list that is updated as the graph of regions is traversed. The variable ACTIVE_LEVEL_LIST is initialised to the empty list because there are no levels active in the region representing the background pixels of the page to be rendered.

Next, the process 630 proceeds to sub-step 715 where a variable STACK stored in the memory 1606 is initialised to the empty stack. The variable STACK is used to store a stack of region graph links that join region graph nodes that have been scheduled for processing in order to generate an active level list and subsequently a list of contributing levels for the region corresponding to each of the region graph nodes.

Next, the process 630 proceeds to sub-step 720 where the region graph node stored in the variable REGION is marked by the processor 1420 as 'VISITED'. Region graph nodes are marked as 'VISITED' to indicate that a list of contributing levels does not need to be generated for the region graph node if the node is subsequently encountered.

Next, the process 630 proceeds to sub-step 725. At this sub-step, the active level list stored in the variable ACTIVE_LEVEL_LIST contains the levels that are active within the pixels represented by the region graph node stored in the variable REGION. In sub-step 725, the active level list stored in the variable ACTIVE_LEVEL_LIST is stored in an ALL field within the region graph node stored in the variable REGION. The active level list stored in the ALL field within a region graph node is used to subsequently determine the active level list for neighbouring region graph nodes.

Next, the process 630 proceeds to sub-step 730 where the list of contributing levels for the region graph node stored in the variable REGION is generated. The list of contributing levels for a region corresponding to a region graph node is a list of the levels that contribute to the colour of the pixels represented by that region. The list of contributing levels for a region is generated by copying the levels in the list of active levels that are visible into a list of contributing levels for the region. An active level is visible if the z-value of the level is higher than or equal to the z-value of the topmost opaque level that is active within a region.

Next, the process 630 proceeds to sub-step 735 where an APPEARANCE field within the region graph node stored in the variable REGION is set to the list of contributing levels generated in sub-step 730. The list of contributing levels stored in the APPEARANCE field within a region graph node is used to determine the colour of the pixels represented by the region corresponding to the region graph node during rendering.

Next, the process 630 proceeds to sub-step 740 where each of the region graph nodes joined to the region graph node stored in the variable REGION by an region graph link, is examined to determine if the region graph node has previously been seen by the process 630. If it is determined in step 740 that there are neighbouring region graph nodes marked as 'UNSEEN', then the process 630 proceeds to sub-step 745 where all of the region graph links joining the region graph node stored in the variable REGION to neighbouring region graph nodes that are marked as 'UNSEEN' are pushed onto the stack stored in the variable STACK. The process then proceeds to sub-step 750 where all of the neighbouring region graph nodes are marked as 'SEEN'.

Next, the process 630 proceeds to sub-step 755. Returning to sub-step 740, if it is determined that there are no neighbouring region graph nodes marked as 'UNSEEN', then the process proceeds to sub-step 755.

In sub-step 755 it is determined by the processor 1420 if there are more region graph links in the stack stored in the variable STACK. If there are more region graph links in the stack stored in the variable STACK, then the process 630 proceeds to sub-step 760 where a region graph link is popped from the stack stored in the variable STACK and is stored in the variable LINK by the processor 1420.

Next, the process 630 proceeds to sub-step 765 where the region graph node joined by the region graph link stored in the variable LINK which is marked as 'VISITED' is stored in the variable REGION. Note, that only one region graph node that is joined by a region graph link that has been pushed onto the stack stored in the variable STACK can be marked as 'VISITED'. This is the region graph node that that was previously stored in the variable REGION, and a list of contributing levels will have previously been generated for this region graph node. The other region graph node joined by a region graph link will have been seen by the process 630, but a list of contributing levels is yet to be generated for the other region graph node.

Next, the process 630 proceeds to sub-step 770 where the active level list stored in the ALL field of the region graph node stored in the variable REGION, is copied by the processor 1420 and stored in the variable ACTIVE_LEVEL_LIST.

Next, the process 630 proceeds to sub-step 775 where the active level list stored in the variable ACTIVE_LEVEL_LIST is updated using the level and direction stored in LEVEL and DIRECTION fields, respectively, of the region graph link stored in the variable LINK. Here LEVEL is a reference to the level to be inserted into, or removed from, the active level list stored in the variable ACTIVE_LEVEL_LIST, and DIRECTION indicates whether the level is to be inserted into (i.e. the activating direction), or removed from (i.e. the deactivating direction), the active level list as the graph of regions is traversed from region graph node to a neighbouring region graph node via the link.

Next, the process 630 proceeds to sub-step 780 where the other region graph node that is joined by the link, that is, the region graph node that is marked as 'UNVISITED', is stored by the processor 1420 in the variable REGION. Next, the process 630 returns to sub-step 720.

Returning to sub-step 755, if it is determined that there are no more links stored in the stack stored in the variable STACK, then the process 630 terminates.

As described previously, the process of determining the objects that contribute to each disjoint region of the page can be time consuming, particularly for pages containing many overlapping objects. The methods described in the prior art perform redundant processing, often computing the contributing levels for each disjoint region more than once. The presently described arrangements ameliorates this problem by creating a graph of regions and updating a list of contributing levels as the graph of regions is traversed. In this fashion the contributing levels for each disjoint region of the page are determined once only, and therefore the present arrangements display an advantage over the prior art.

However, there may be some pages where a scan line based technique, for example, is faster than the technique described herein. For example, if a page contains many small regions, there will be little redundant processing performed by a scan line based technique, whereas the technique of generating and traversing a graph of regions will incur additional computational overhead.

A further aspect of the present disclosure is the determination of whether to use a scan line based technique or the technique of generating and traversing a graph of regions in order to form the list of contributing levels for each disjoint region on a page to be rendered. This determination is based on the complexity of the page to be rendered and is preferably based on the number of object edges in the page and the number of crossings of those edges. If the number of edges and edge crossings is greater than or exceeds a predetermined threshold, the page is complex and a scan line based technique is used. Otherwise, the page is relatively simple and the technique of generating and traversing a graph of regions is used. The contributing levels for each disjoint region of the page will therefore be determined in the fastest way possible.

A further aspect of the present disclosure is the determining of the contributing levels for each disjoint region within a portion of the page, such as a band or single tile of a page. Using this further aspect, a page can be preferably split into many tiles, and the contributing levels for the disjoint regions within each tile can be determined in parallel on a multi-core processor. An example of a multi-core processor is the controller processor 1470 described previously with reference to FIG. 14. The time taken to determine the contributing levels for all disjoint regions of a page can therefore be further reduced.

Figure 17A:
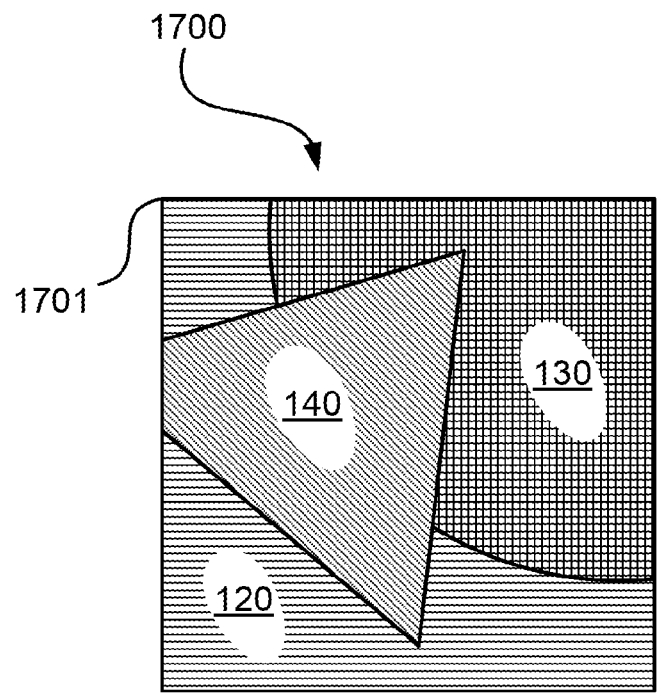
FIGS. 17a and 17b collectively show an example of determining the contributing levels for each disjoint region within a single tile of a page.

FIG. 17*a* shows an example of a tile 1700 of the page 110 of FIG. 1 and the graphic objects 120, 130 and 140 that overlap within that tile. The rectangle graphic object 120 with a horizontally hatched fill overlaps the entire tile 1700. The circle graphic object 120 with a vertically hatched fill partially overlaps the tile 1700. The triangle graphic object 140 with a diagonally hatched fill also partially overlaps the tile 1700.

Figure 17B:
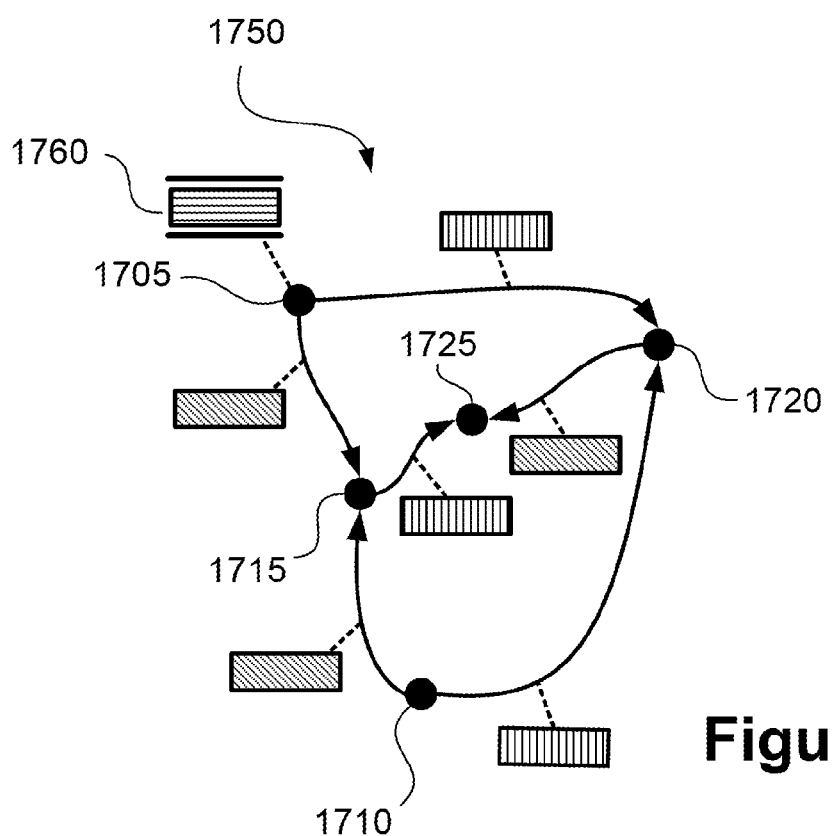

FIG. 17*b* shows a graph of regions 1750 generated for the tile 1700 shown in FIG. 17*a*. Region graph nodes 1705 and 1710 represent disjoint regions that contain only the rectangle graphic object 120. Region graph node 1715 represents the disjoint region that contains the rectangle graphic object 120 and the triangle graphic object 140. Region graph node 1720 represents the disjoint region that contains the rectangle graphic object 120 and the circle graphic object 130. Region graph node 1725 represents the disjoint region that contains the rectangle graphic object 120, the circle graphic object 130 and the triangle graphic object 140.

The process of traversing the graph of regions to determine the list of contributing levels for each region (described previously with reference to FIG. 7) must start with a region graph node that has a known list of contributing levels. When traversing the graph of regions for an entire page, this initial region graph node is the region graph node that represents the background region, which contains an empty list of contributing levels. When traversing the graph of regions for a single tile, however, the tile may not contain a disjoint region that contains only background pixels. Another region of known list of contributing levels is used.

Also shown in FIG. 17*b* is the initial list of contributing levels 1760 associated with region graph node 1705. Region graph node 1705 corresponds to the region in the top-left corner of the tile 1701, seen in FIG. 17*a*. The list of contributing levels 1760 is determined by processing the edges that intersect the tile boundaries in a sequential manner. When the top-left corner of the tile 1701 is encountered, the current list of contributing levels 1760 is assigned to the region graph node 1705 that represents the region in the top-left corner of the tile. The graph of regions 1750 for the tile 1700 is subsequently traversed starting from this region graph node 1705 with a known list of contributing levels 1760. A similar process is performed for all tiles on the page.

According to a further aspect, the determination of whether to use a scan line based technique, or the technique of generating and traversing a graph of regions in order to form the list of contributing levels for each disjoint region, can be performed on a tile basis for a page to be rendered. This determination is based on the number of edges in the tile and the number of crossings of those edges. A value for the complexity can be assessed and the value compared against an appropriate threshold. Where the complexity is relatively high, scan line rendering is desirably used, but where the complexity is relatively low, region graph rendering is used.

Figure 18:
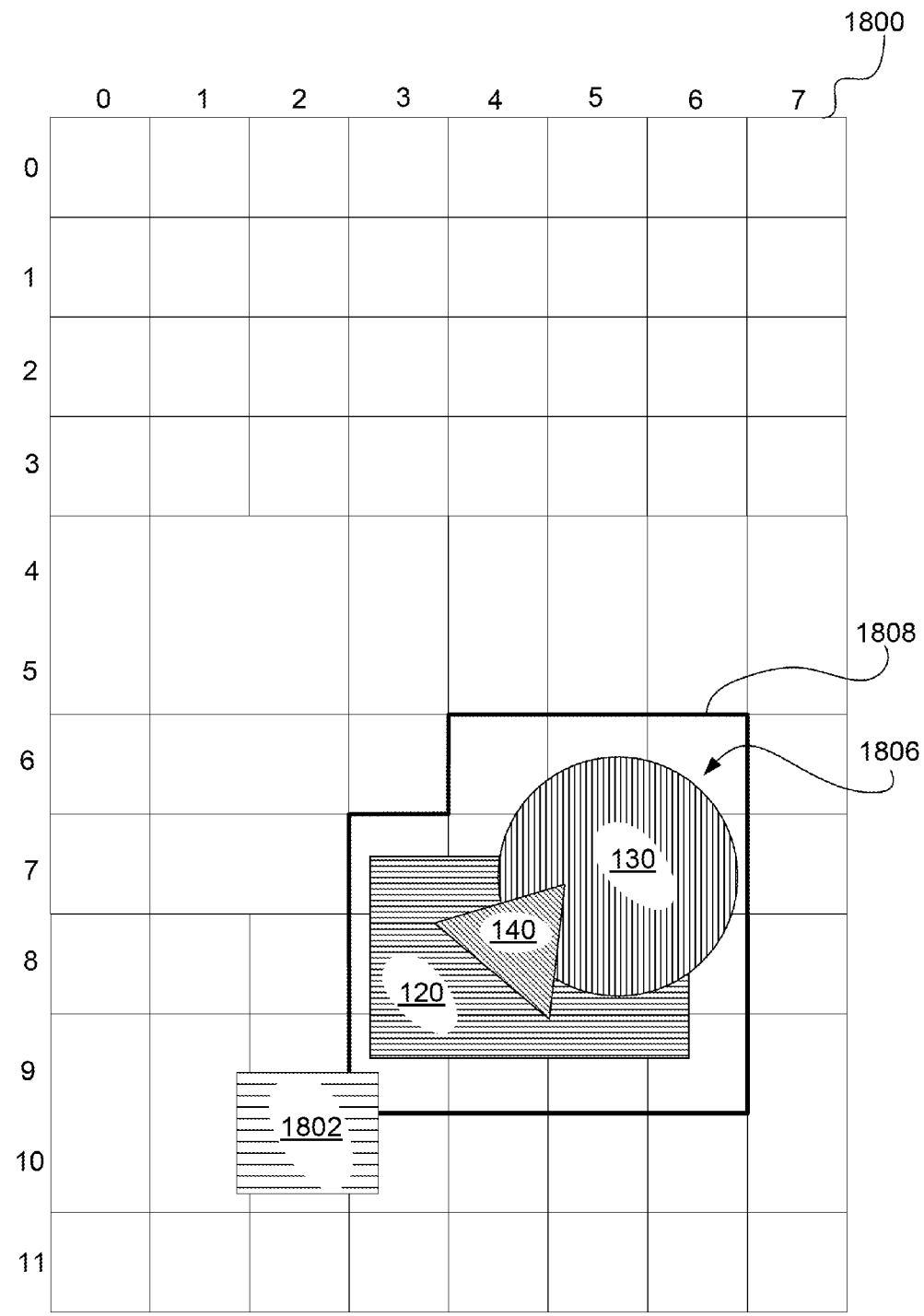
FIG. 18 represents a tiled page and different manners in which tiles of that page can be rendered.

An example is seen in FIG. 18 which shows a page 1800 to be rendered, and which is divided in to 8×12=96 tiles, with rows and columns numbered for convenience. The page 1800 includes a group of overlapping objects 1806 which, in this example, correspond to the objects 120, 130 and 140 shown in FIG. 1 and discussed in detail above. The group 1806 are positioned within or overly a corresponding group of tiles 1808 spanning rows 6 to 9 of the page 1800. The group of tiles 1808 are of relatively low complexity. Not illustrated for the sake of clarity, the remaining tiles of the page 1800, being those excluding the tiles 1808, have many objects and object edges and intersections thereby representing relatively high complexity. An object 1802 is seen to span between the areas of high complexity and low complexity.

According to this further aspect, the manner in which all graphic objects on the page 1800 are rendered is determined based upon the complexity of objects in individual tiles or groups of tiles. For all tiles in rows 0 to 5, being one or more bands of the page 1800, a band including a plurality of whole scan lines, the complexity is high. Those tiles or that band may be rendered according to traditional scan-line techniques. The same also applied to tiles in rows 10 and 11, In a first implementation of this tile-based approach, it is noted that the tiles 1808 associated with the group 1806 of overlapping objects occur in rows 6 to 9. Whilst the tiles 1808 are of relatively low complexity, they lie in rows or bands that include tiles of relatively high complexity. Those rows may then be assessed and all objects therein may be rendered according to traditional scan-line based techniques. Thus the entire page may be rendered in a scan-line fashion.

In a second implementation of the tile-based approach, rendering of rows 6 to 9 can also be broken into scan-line rendering and region graph rendering. Particularly, tiles (0,6) to (3,6) and (0,7) to (2,7) are seen associated with high complexity, and thus may be rendered using scan-line techniques. The tiles 1808 associated with the group 1806 of objects, because of their relatively lower complexity, are desirably rendered using the region graph approach of the present disclosure. The remaining tiles of row 8, being tiles (0,8) to (2,8), and tiles (0,9) to (2,9), together with those in the right column (7,6) to (7,9), and also tile (0,9) may similarly be rendered in a scan line fashion. This second implementation is more involved than the first, as the second requires ensuring consistency of edge tracking at tile boundaries to ensure continuity in the rendered result. In the illustrated example, object 1802 is seen to span tiles (2,9) and (3,9) and, as such, the object 1802 shares the tile (3,9) with grouped object 1806. Accordingly, for the tile (2,9) to be rendered using scan-line techniques, and the tile (3,9) to be rendered using region-graph techniques of the present disclosure, it is important to ensure continuity at the tile boundary through the rendering of the object 1802 according to the two different rendering techniques. Such continuity may be obtained for example by dividing the object 1802 into two parts along the relevant tile boundary, effectively creating two objects, one of which lies in the complex tile and may be rendered in a scan-line fashion, and the other part lies in less complex region tile and may be rendered in the region graph fashion. Pixel values for each rendered partial object will then be consistent along the tile boundary.

INDUSTRIAL APPLICABILITY

The arrangements described are applicable to the computer and data processing industries and particularly for the efficient printing of page object information. The foregoing describes only some embodiments of the present invention, and modifications and/or changes can be made thereto without departing from the scope and spirit of the invention, the embodiments being illustrative and not restrictive.

The invention claimed is:

1. A method of rendering a plurality of graphical objects, said method comprising:
   generating a region graph having a plurality of nodes, one for each disjoint region identified using at least a plurality of intersection points of the graphical objects, each disjoint region representing a particular combination of the graphical objects, wherein the plurality of nodes are linked by at least one region graph link that encodes a change in an active level list when traversing between neighboring nodes;
   assigning an object level of an associated object and an activating direction to the at least one region graph link, the object level and the activation direction defining an appearance of the region associated with the at least one region graph link;
   determining a plurality of region graph links joining a selected node with further nodes;
   determining a contributing level for the selected node using object levels and activating directions assigned to the determined plurality of region graph links, the contributing level contributing to the appearance of the region including color of pixels represented by the region; and
   rendering the plurality of graphical objects using at least the determined contributing level for a disjoint region corresponding to the selected node.

2. The method according to claim 1, wherein the rendering step comprises the steps of:
   rendering each region to pixels using the contributing level associated with the region.

3. The method according to claim 1, wherein the step of the generating the region graph comprises:
   generating a plurality of nodes for an edge graph based on the plurality of intersection points of the graphical objects; and
   generating the region graph from the edge graph.

4. The method according to claim 3, wherein the generating of the region graph from the edge graph comprises generating a dual for the edge graph to form the region graph.

5. The method according to claim 4, wherein the dual of the edge graph is the region graph which has:
   (a) a node for each plane region of the edge graph, and
   (b) at least a region graph link joining two neighbourhood regions of the edge graph.

6. The method according to claim 5, wherein the dual is determined by:
   sorting the edge graph edges dividing neighbourhood regions of the edge graph in a predetermined direction from a current edge;
   determining a next edge in the predetermined direction at an edge graph node where the current edge and the next edge meet;
   adding a node of the region graph to a region, said region having an appearance determined by the next edge; and
   assigning a contributing level and an activating direction to a region graph link ending at the added node, the level and the activation direction defining the appearance of the region.

7. The method according to claim 3, wherein the contributing level associated with a region graph link is associated with an edge of the edge graph that the region graph link crosses.

8. The method according to claim 1, wherein the activating direction of a region graph link is the direction towards a node of the region graph to which the contributing level of the region graph link is assigned.

9. A method of rendering a plurality of graphical objects, said method comprising:
   generating a first region graph node associated with a first disjoint region for an object edge pair in a current scan line;
   sorting the object edge pair in a subsequent scan line;
   determining a crossing of said object edge pair in the subsequent scan line;
   generating a second region graph node associated with a second disjoint region as a result of the crossing of said object edge pair;
   joining the first region graph node and the second region graph node to form a region graph link of a region graph, the region graph link encoding a change in an active level list when traversing between the first and second region graph nodes;
   associating an object level of an associated object and an activating direction to the region graph link, said object level and said activation direction defining an appearance of the second disjoint region;
   determining a plurality of region graph links linking the second region graph node with further region graph nodes;
   determining a contributing level for the second region graph node using object levels and activating directions assigned to the determined plurality of region graph links, the contributing level contributing to the appearance of the second disjoint region including color of pixels represented by the second disjoint region; and
   rendering the plurality of graphical objects using at least the determined contributing level for the second disjoint region corresponding to the second region graph node.

10. The method according to claim 9, wherein the rendering step comprises:
    rendering each region to pixels using the contributing level associated with the region.

11. The method according to claim 9, wherein the activating direction of a region graph link is the direction towards a node of the region graph to which the contributing level of the region graph link is assigned.

12. A method of rendering a page comprising a plurality of graphical objects, said method comprising:

determining a rendering complexity associated with at least a portion of the page and graphical objects of that portion;

comparing the determined complexity with a threshold value; and region rendering the portion, where the determined complexity is less than the threshold value, by one of:

(A) generating a region graph having a plurality of nodes, one for each disjoint region identified using at least a plurality of intersection points of graphical objects in the portion, each disjoint region representing a particular combination of the graphical objects, wherein the plurality of nodes are linked by at least one region graph link;

assigning an object level of an associated object and an activating direction to the at least one region graph link, the object level and the activation direction defining an appearance of the region associated with the at least one region graph link, the at least one region graph link encoding a change in an active level list when traversing between neighboring nodes;

determining a plurality of region graph links joining a selected node with further nodes;

determining a contributing level for the selected node using object levels and activating directions assigned to the determined plurality of region graph links, the contributing level contributing to the appearance of the region including color of pixels represented by the region; and rendering the plurality of graphical objects using at least the determined contributing level for a disjoint region corresponding to the selected node; or (B) generating a first region graph node associated with a first disjoint region for an object edge pair of a plurality of graphical objects in a current scan line of the portion;

sorting the object edge pair in a subsequent scan line of the portion;

determining a crossing of said object edge pair in the subsequent scan line;

generating a second region graph node associated with a second disjoint region as a result of the crossing of said object edge pair;

joining the first region graph node and the second region graph node to form a region graph link of a region graph, the region graph link encoding a change in an active level list when traversing between the first and second region graph nodes;

associating an object level of an associated object and an activating direction to the region graph link, the object level and the activation direction defining an appearance of the second disjoint region;

determining a plurality of region graph links linking the second region graph node with further region graph nodes;

determining a contributing level for the second region graph node using object levels and activating directions assigned to the determined plurality of region graph links, the contributing level contributing to the appearance of the second disjoint region including color of pixels represented by the second disjoint region; and rendering the plurality of graphical objects using at least the determined contributing level for the second disjoint region corresponding to the second region graph node.

13. The method according to claim 12 further comprising: scan rendering the portion, where the determined complexity is greater than the threshold, according to a scan-line rendering technique.

14. The method according to claim 13 wherein the portion comprises a band of the page.

15. The method according to claim 13 wherein the portion comprises a tile of the page.

16. The method according to claim 15 further comprising: identifying at least one said graphical object which spans a first tile to be scan rendered and a second tile to be region rendered;

dividing said one graphical object into a first part within the first tile and a second part with the second tile;

scan rendering the first tile including the first part; and region rendering the second tile including the second part.

17. A non-transitory computer readable storage medium, having a computer program recorded thereon, the program being executable by computer apparatus to render a plurality of graphical objects, said program comprising:

code for generating a region graph having a plurality of nodes, one for each disjoint region identified using at least a plurality of intersection points of the graphical objects, each disjoint region representing a particular combination of the graphical objects, wherein the plurality of nodes are linked by at least one region graph link;

code for assigning an object level of an associated object and an activating direction to the at least one region graph link, the object level and the activation direction defining an appearance of the region associated with the at least one region graph link the at least one region graph link encoding a change in an active level list when traversing between neighboring nodes;

code for determining a plurality of region graph links joining a selected node with further nodes;

code for determining a contributing level for the selected node using object levels and activating directions assigned to the determined plurality of region graph links, the contributing level contributing to the appearance of the region including color of pixels represented by the region; and code for rendering the plurality of graphical objects using at least the determined contributing level for a disjoint region corresponding to the selected node.

18. A non-transitory computer readable storage medium, having a computer program recorded thereon, the program being executable by computer apparatus to render a plurality of graphical objects, the program comprising:

code for generating a first region graph node associated with a first disjoint region for an object edge pair in a current scan line;

code for sorting the object edge pair in a subsequent scan line;

code for determining a crossing of said object edge pair in the subsequent scan line;

code for generating a second region graph node associated with a second disjoint region as a result of the crossing of said object edge pair;

code for joining the first region graph node and the second region graph node to form a region graph link of a region graph, the region graph link encoding a change in an active level list when traversing between the first and second region graph nodes;

code for associating an object level of an associated object and an activating direction to the region graph link, the object level and the activation direction defining an appearance of the second disjoint region;

code for determining a plurality of region graph links linking the second region graph node with further region graph nodes;

code for determining a contributing level for the second region graph node using object levels and activating directions assigned to the determined plurality of region graph links, the contributing level contributing to the appearance of the second disjoint region including color of pixels represented by the second disjoint region; and code for rendering the plurality of graphical objects using at least the determined contributing level for the second disjoint region corresponding to the second region graph node.

19. An apparatus comprising at least a processor and a memory coupled to the processor, the memory having at least first and second programs recorded thereon, the at least first and second programs being executable by the processor to adapted to render a plurality of graphical objects, wherein (A) the first program comprises:

code for generating a region graph having a plurality of nodes, one for each disjoint region identified using at least a plurality of intersection points of the graphical objects, each disjoint region representing a particular combination of the graphical objects, wherein the plurality of nodes are linked by at least one region graph link;

code for assigning an object level of an associated object and an activating direction to the at least one region graph link, the object level and the activation direction defining an appearance of the region associated with the at least one region graph link, the at least one region graph link encoding a change in an active level list when traversing between neighboring nodes;

code for determining a plurality of region graph links joining a selected node with further nodes;

code for determining a contributing level for the selected node using object levels and activating directions assigned to the determined plurality of region graph links, the contributing level contributing to the appearance of the region including color of pixels represented by the region; and code for rendering the plurality of graphical objects using at least the determined contributing level for a disjoint region corresponding to the selected node; and (B) the second program comprises:

code for generating a first region graph node associated with a first disjoint region for an object edge pair in a current scan line;

code for sorting the object edge pair in a subsequent scan line;

code for determining a crossing of said object edge pair in the subsequent scan line;

code for generating a second region graph node associated with a second disjoint region as a result of the crossing of said object edge pair;

code for joining the first region graph node and the second region graph node to form a region graph link of a region graph, the region graph link encoding a change in an active level list when traversing between the first and second region graph nodes;

code for associating an object level of an associated object and an activating direction to the region graph link, said object level and said activation direction defining an appearance of the second disjoint region;

code for determining a plurality of region graph links linking the second region graph node with further region graph nodes;

code for determining a contributing level for the second region graph node using object levels and activating directions assigned to the determined plurality of region graph links, the contributing level contributing to the appearance of the second disjoint region including color of pixels represented by the second disjoint region; and code for rendering the plurality of graphical objects using at least the determined contributing level for the second disjoint region corresponding to the second region graph node.

20. A method of rendering a plurality of graphical objects, said method comprising:

determining a plurality of disjoint regions by identifying intersection points of the received objects, each of disjoint regions representing a particular combination of the graphical objects;

generating a region graph having a plurality of nodes, one for each disjoint region, the nodes being linked by region graph links, wherein each region graph link is assigned an object level of an associated object and an activating direction and encodes a change in an active level list when traversing between the neighboring nodes;

identifying a plurality of region graph links joining a selected node with further nodes to determine a contributing level for the selected node, the contributing level contributing to the appearance of the each disjoint region, corresponding to the selected node, including color of pixels represented by the second disjoint region; and rendering the plurality of graphical objects using at least the determined contributing level for a disjoint region corresponding to the selected node.

* * * * *